(12) United States Patent
Kakiuchi et al.

(10) Patent No.: US 7,590,284 B2
(45) Date of Patent: Sep. 15, 2009

(54) PUPIL COLOR ESTIMATING DEVICE

(75) Inventors: Takashi Kakiuchi, Kusatsu (JP);
Masahiro Senga, Otokuni-gun (JP);
Satoshi Hosoi, Kusatsu (JP); Miki Matsuoka, Kyoto (JP)

(73) Assignee: OMRON Corporation, Kyoto (JP)

( * ) Notice: Subject to any disclaimer, the term of this patent is extended or adjusted under 35 U.S.C. 154(b) by 806 days.

(21) Appl. No.: 10/981,146

(22) Filed: Nov. 4, 2004

(65) Prior Publication Data
US 2005/0129331 A1 Jun. 16, 2005

(30) Foreign Application Priority Data

| Nov. 5, 2003 | (JP) | ............................. 2003-375804 |
| Sep. 16, 2004 | (JP) | ............................. 2004-270155 |

(51) Int. Cl.
*G06K 9/00* (2006.01)
(52) U.S. Cl. .................................................... 382/167
(58) Field of Classification Search ......... 382/162–167, 382/115–118, 181, 190–199, 254, 266–275; 348/222.1–262; 358/518–523
See application file for complete search history.

(56) References Cited

U.S. PATENT DOCUMENTS 7,181,091 B2 * 2/2007 Yoda ........................... 382/309

| 2003/0021478 A1 | 1/2003 | Yoshida |
| 2003/0202105 A1 | 10/2003 | Gaubatz et al. |
| 2005/0047656 A1 * | 3/2005 | Luo et al. .................... 382/167 |

FOREIGN PATENT DOCUMENTS

EP 0 899 686 A2 3/1999

OTHER PUBLICATIONS

Smolka B. et al.; "Towards automatic redeye effect removal"; Pattern Recognition Letters, North-Holland Publ. Amsterdam, NL, vol. 24, No. 11, Jul. 2003; pp. 1767-1785; XP004416063; ISSN: 0167-8655.
European Search Report dated Apr. 6, 2006.

* cited by examiner

*Primary Examiner*—Samir A. Ahmed
*Assistant Examiner*—Atiba O Fitzpatrick
(74) *Attorney, Agent, or Firm*—Osha • Liang LLP

(57) ABSTRACT

An original pupil color of a subject person in an image in which an abnormality such as a red-eye or gold-eye occurs is estimated. Further, whether an image correction is required or not and to produce an image having a natural pupil color in the image correction by estimating the original pupil color from the image is judged. A pupil color estimating device has a skin color of a subject person specified from an inputted image, regardless of whether an abnormality such as a red-eye or gold-eye occurs. This skin color is substituted in an approximate equation based upon a statistical result carried out in advance, and thereby a normal color component of a pupil is estimated from the skin color of the subject person.

16 Claims, 15 Drawing Sheets

PUPIL COLOR ESTIMATING DEVICE

BACKGROUND OF THE INVENTION

1. Field of the Invention

The present invention relates to a technique that is effective when it is applied to an imaging device for image-capturing an image (particularly, an image in which a person's face is image-captured), an information processing device or an output device that handles an image, a software or the like.

2. Description of the Related Art

Conventionally, a red-eye phenomenon wherein a pupil or whole pupil of the image-captured person is image-captured to be red becomes a problem, regardless of a digital camera or silver-halide camera. As a similar problem, there is gold-eye phenomenon in which a pupil or whole pupil of a person is image-captured to be gold. The red-eye or gold-eye phenomenon described above (hereinafter, the explanation is made by taking the red-eye phenomenon as an example) is a phenomenon caused such that flash light incident on a bulb of an eye from a pupil region is reflected on the retina. Since the distance between the optical axis of a camera and a flash becomes close to each other recently due to the miniaturization of a camera, the rate of occurrence of the red-eye phenomenon increases, which becomes a problem in particular.

A red-eye preventing flash has been proposed as a technique for preventing and reducing the above-mentioned red-eye phenomenon. This is a technique wherein a flash is lightly emitted immediately before the image-capture, and then, the flash is again emitted. According to this technique, the pupil of the image-captured person is contracted by the first emission, so that the occurrence of the red-eye phenomenon by the flash after that can be prevented and reduced.

However, when the red eye phenomenon occurs, the red eye is required to be image-corrected, so long as the image cannot be retaken. As an image-correction technique as described above, there has conventionally been proposed a method wherein a pixel having the red-eye phenomenon is designated and the color of this pixel is changed to correct the image.

Further, in the case where a color of a pixel having the red-eye phenomenon occurring is changed, it is required that the pupil color after the change is determined. As a technique for determining the pupil color, there has conventionally been proposed a technique wherein a user selects a pupil color recorded in advance every race for changing the color of the pixel of the pupil by using this selected color. Moreover, as a similar technique, there has been proposed a method wherein a natural-looking pupil color is selected among a plurality of patterns such as "a pattern turned to look like an European" or "a pattern of Orientals", to thereby make a change by using this color.

However, the image of the pupil having the red-eye phenomenon already occurring loses the original color of the pupil. Therefore, it is difficult to estimate the original color of the pupil from the image of the pupil having the red-eye phenomenon. If the original color of the pupil cannot be estimated, it is naturally difficult to produce a natural image even if the correction is intended to be executed by using a conventional technique.

Further, even if the above-mentioned techniques are applied, a user is required to estimate the race of the subject by a visual observation. In general, there are not so many users having knowledge about the race, so that estimating the pupil color based upon the race is a difficult and troublesome process for the user.

Additionally, it is considered that, as a method for correcting the color of the pupil, a reddish section is simply removed from the color of the pupil having the red-eye phenomenon, not replacing the color of the pupil by estimating the original color of the pupil. However, there is a problem upon performing such a correcting method. A person's sight has a feature of judging colorfulness by a color contrast. Therefore, in the case where a subject is a ruddy-cheeked person or a subject is photographed under a red illumination, there is a possibility that an unnatural image is produced on the contrary only by performing the correction for simply removing the reddish section from the color of the pupil.

SUMMARY OF THE INVENTION

An object of the present invention is to provide a technique capable of estimating a color of a pupil of an image-captured person (an original color of a pupil in the captured image) from an image of the image-captured person, in the case where it is recognized that an abnormality which can appear in an image of a pupil region such as a red-eye phenomenon, does not occur.

In the following explanation, a skin color means a skin color of anyone and any race, and it is not limited to a skin color of a specific person or specific race.

[First Aspect]

In order to solve the above-mentioned problem, the present invention has a configuration described later. The first aspect is a pupil color estimating device and includes skin color specifying means and pupil color estimating means.

The skin color specifying means specifies a skin color of a subject person in an inputted image. The skin color specifying means may be configured to specify a skin color manually by a user. The skin color specifying means may be configured such that a color designated by a user from the inputted image, a pixel color in the image designated by the user (i.e., a measured value at the section designated by the user) or the like is specified as the skin color of the person. Further, the skin color specifying means may be configured to specify a skin color based upon the input from the user. The skin color specifying means may be configured to specify the statistical result (average, mode, intermediate value, or the like) of a pixel color at the region in the image designated by the user as the skin color of the person.

Further, the skin color specifying means may be configured to specify a skin color independently of the input from the user. The skin color specifying means having such configuration will be explained in the second aspect.

The pupil color estimating means estimates a color of the pupil of the person that should be shown in the image based upon the skin color specified by the skin color specifying means. The "color of the pupil of the person that should be shown in the image" estimated by the pupil color estimating means is not the color itself of the pupil region in the inputted image, but indicates a color of the pupil recognized to be shown in the image that is image-captured without having an abnormality such as a red-eye or gold-eye phenomenon occurring, in other words, indicates a color of the pupil that should originally be outputted.

In the first aspect having the above-mentioned configuration, the skin color of a subject person is specified from the inputted image, and based upon this skin color, the color of the pupil of the person is estimated. Therefore, it is possible to estimate the color of the pupil that is natural and has no sense of incongruity with the color contrast considered for the skin color in this image. Accordingly, the original color of the pupil (the color of the pupil recognized to be shown (outputted) in the case where an abnormality does not occur) can be estimated from the image in which the original color of the pupil is lost due to the occurrence of the red-eye phenomenon or gold-eye phenomenon.

[Second Aspect]

The second aspect is a pupil color estimating device and is configured to be provided with face detecting means, skin color specifying means and the pupil color estimating means in the first aspect.

The face detecting means detects a face region of a subject person in an inputted image. "The face region" means a region including a part of the face or whole face of the subject person.

The skin color specifying means in the second aspect specifies the skin color of the person from a pixel color included in the face region detected by the face detecting means. The skin color specifying means may be configured to specify the statistical result (average, mode, intermediate value, or the like) of a pixel color at the face region detected by the face detecting means as the skin color of the person.

In the second aspect having the above-mentioned configuration, the skin color of a subject person is specified from the inputted image, and based upon this skin color, the color of the pupil of the person is estimated. Therefore, like the first aspect, it is possible to estimate the color of the pupil that is natural and has no sense of incongruity with the color contrast considered for the skin color in this image. Accordingly, the original color of the pupil (the color of the pupil recognized to be shown (outputted) in the case where an abnormality does not occur) can be estimated from the image in which the original color of the pupil is lost due to the occurrence of the red-eye phenomenon or gold-eye phenomenon.

In the second aspect, the skin color specifying means performs a processing based upon the detected result by the face detecting means, thereby being capable of specifying the skin color independently of the input from the user (i.e., even though a color or a region in the image for specifying the color is not designated by the user upon the specifying process of the skin color). Therefore, a troublesome job of the user can be saved.

[Third Aspect]

The third aspect is further provided with pupil region specifying means and judging means, in addition to the components of the first or second aspect. The pupil region specifying means specifies the region of the pupil of a subject person in an image. The pupil region specifying means may be configured to specify the region of the pupil based upon the input from a user, or may be configured to specify the region of the pupil independently of the input from the user.

The judging means compares the color of the pupil estimated by the pupil color estimating means and the color of the pupil region specified by the pupil region specifying means. The judging means judges whether an abnormality occurs or not at the pupil section in the image based upon this comparison result. The abnormality occurring at the pupil section in the image means, for example, a red-eye phenomenon or gold-eye phenomenon, which is an abnormality occurring on a part of the pupil section or whole color.

In the third aspect having the above-mentioned configuration, the color of the pupil estimated from the skin color and the color of the pupil region specified from the image are compared to judge whether an abnormality occurs or not at the pupil section in the image. Accordingly, the user can easily determine a measure to this image based upon this judging result. For example, in the case where the user thinks of performing a correction to the image on which an abnormality occurs, he/she can judge whether the correction is made or not based upon this judging result. Further, in the case where the user thinks of retaking an image when an abnormality occurs on the image-captured image, for example, he/she can judge whether the image is recaptured or not based upon this judging result.

[Fourth Aspect]

The fourth aspect is further provided with pupil detecting means and judging means in addition to the components in the second aspect.

The pupil detecting means detects the pupil region of the person detected by the face detecting means. "The pupil region" means a region including a part of the pupil or whole pupil of the subject person.

The judging means compares the color of the pupil estimated by the pupil color estimating means and the color specified from the pupil region detected by the pupil detecting means, thereby judging whether an abnormality occurs or not on the color of the pupil of the person in the image that is to be processed. For example, the judging means makes a judgement by comparing the color of each pixel in the detected pupil region and the estimated pupil color. Moreover, the judging means may specify one representative value from the color of each pixel in the detected pupil region by a statistical process, thereby making a judgement by comparing this representative value and the estimated pupil color.

In the fourth aspect having the above-mentioned configuration, the color of the pupil estimated from the skin color and the color in the detected pupil region are compared to judge whether an abnormality occurs or not at the pupil section in the image. Accordingly, like the third aspect, the user can easily determine a measure to this image based upon this judging result. Further, in the fourth aspect, the judging means performs a processing based upon the detected result by the pupil detecting means, thereby being capable of specifying the color of the pupil independently of the input from the user (i.e., even though a color or a region in the image for specifying the color is not designated by the user upon the specifying process of the pupil color). Therefore, a troublesome job of the user can be saved.

[Fifth Aspect]

The fifth aspect is further provided with correcting means in addition to the components in the first or second aspect. The correcting means corrects the color of the pupil of the person based upon the color of the pupil estimated by the pupil estimating means. The correcting means may be configured to make a correction based upon an input from a user or may be configured to make a correction independently of the input from the user. For example, the correcting means may be configured to make a correction to a pixel of the pupil designated by the user. Further, the correcting means may be configured, for example, to make a correction to the pupil region designated by the user. Moreover, the correcting means may be configured, for example, to make a correction to the pupil region determined based upon the color or pixel designated by the user.

In the fifth aspect, the color of the pupil of the person in the image is corrected based upon the pupil color estimated by the pupil color estimating means. Therefore, a correction considering the color contrast, i.e., a natural correction having no sense of incongruity can be made to the pupil. Specifically, correction quality can be enhanced.

[Sixth Aspect]

The sixth aspect is further provided with the pupil detecting means in the fourth aspect and correcting means, in addition to the components in the second aspect.

The correcting means in the sixth aspect corrects the color of the pupil with respect to the pupil region detected by the pupil detecting means based upon the pupil color estimated by the pupil color estimating means.

In the sixth aspect, the pupil color of the person in the image is corrected based upon the pupil color estimated by the pupil color estimating means, like the fifth aspect. Therefore, a correction considering the color contrast, i.e., a natural correction having no sense of incongruity can be made to the pupil. Specifically, correction quality can be enhanced.

Further, in the sixth aspect, the correcting means performs a processing based upon the detected result by the pupil detecting means, thereby being capable of correcting the color of the pupil independently of the input from the user. Therefore, it is unnecessary for the user to designate a pixel or a region to the pupil color estimating device, which makes it possible to save a troublesome job of the user.

[Seventh Aspect]

The seventh aspect is further provided with correcting means in addition to the components in the third or fourth aspect. In the seventh aspect, the correcting means corrects the pupil color of the person based upon the pupil color estimated by the pupil color estimating means, in the case where an abnormality is judged to occur on the pupil color by the judging means. Specifically, the correcting means in the seventh aspect operates as the correcting means provided at the fifth aspect, in the case where the judging means judges that an abnormality occurs.

According to the seventh aspect, the correcting process is executed based upon the judging result by the judging means, thereby being capable of saving useless process such as the execution of the correcting process to an image to which the correcting process is unnecessary.

Further, the correcting means provided at the seventh aspect operates as the correcting means provided at the fifth aspect, so that the pupil color of the person in the image is corrected based upon the pupil color estimated by the pupil color estimating means. Therefore, a correction considering the color contrast, i.e., a natural correction having no sense of incongruity can be made to the pupil. Specifically, correction quality can be enhanced.

[Eighth Aspect]

The eighth aspect is further provided with correcting means in addition to the components in the fourth aspect. The correcting means in the eighth aspect executes the correcting process, like the correcting means in the seventh aspect, in the case where an abnormality is judged to occur on the pupil color by the judging means. Further, the correcting means in the eighth aspect corrects the pupil color with respect to the pupil region detected by the pupil detecting means based upon the pupil color estimated by the pupil color estimating means, like the correcting means in the sixth aspect.

The eighth aspect can save useless process such as the execution of the correcting process to an image to which the correcting process is unnecessary, like the seventh aspect.

Moreover, the correcting means provided at the eighth aspect operates as the correcting means provided at the sixth aspect for executing the correcting process, thereby affording the following effects. Specifically, the pupil color of the person in the image is corrected based upon the pupil color estimated by the pupil color estimating means, like the fifth aspect. Therefore, a correction considering the color contrast, i.e., a natural correction having no sense of incongruity can be made to the pupil. Specifically, correction quality can be enhanced. Further, like the sixth aspect, the correcting means performs a processing based upon the detected result by the pupil detecting means, thereby being capable of correcting the color of the pupil independently of the input from the user. Therefore, it is unnecessary for the user to designate a pixel or a region to the pupil color estimating device, which makes it possible to save a troublesome job of the user.

[Ninth Aspect]

The ninth aspect has the judging means in the third, fourth, seventh and eighth aspects having the following configuration. In the ninth aspect, the judging means judges whether a red-eye occurs or not as an example of an abnormality occurring on the image. More specifically, the judging means compares the red section in the pupil color estimated by the pupil color estimating means and the red section in the color specified from the pupil region detected by the pupil detecting means, to thereby judge whether the pupil section in the image becomes a red eye or not.

[Tenth Aspect]

In the tenth aspect, the correcting means in the fifth to eighth aspects is configured as follows. The correcting means makes a correction to a pixel, which is a subject to be corrected, with the brightness of this pixel maintained. In the case where the pupil detecting means is provided like the eighth aspect, the correcting means in the tenth aspect makes a correction to a pixel in the pupil region detected by the pupil detecting means with the brightness of this pixel maintained.

Incidentally, a man's sight generally catches a spherical shape of a bulb or a sense of wettability on the surface of the bulb by a so-called catch light (regular reflection phenomenon caused on the surface of a bulb). Therefore, an image of a pupil having no catch light is sometimes grasped as an unnatural image for a person.

Further, a catch light itself is lost from an image of a pupil having caused thereon a red-eye phenomenon or gold-eye phenomenon, but the distribution of the brightness in this image shows the same distribution in the case of the catch light in most cases.

A correction is made while keeping the brightness of the pixel as described above in the tenth aspect. Therefore, it is possible to naturally express a spherical shape of a bulb or a sense of wettability on the surface of the bulb in the image of the pupil after the correction without losing a so-called catch light. Accordingly, high-quality image correction can be realized.

[Eleventh Aspect]

The eleventh aspect is configured such that, in the aforesaid each aspect, the pupil color estimating means estimates a pupil color based upon a correlation between a skin color and a pupil color, this correlation obtained based upon the result of a statistical process of a skin color and a pupil color obtained from an image including a subject person that is recognized to have no abnormality occurring on the pupil section. "The result of a statistical process" here means the result of a statistical process executed with respect to a skin color and a pupil color in an image that includes a subject person that is recognized to have no abnormality occurring on the image of the pupil. The pupil color estimating means may be configured to estimate a pupil color based upon a table that is made based upon the aforesaid correlation and wherein a skin color and a pupil color are associated with each other. Further, the pupil color estimating means may be configured to estimate a pupil color based upon a relational expression between a skin color and a pupil color obtained based upon the aforesaid correlation.

This configuration allows the pupil estimating means to estimate a more natural pupil color supported by the result of the statistical process based upon the skin color of the subject person.

[Twelfth Aspect]

The twelfth aspect is further provided with an approximate equation storing unit, a race estimating unit and a selecting unit in the above-mentioned each embodiment. The approximate equation storing unit stores the approximate equation used for estimating a pupil color so as to associate with the race. Such approximate equation is an approximate equation obtained by the result of the statistical process shown in the eleventh embodiment and is obtained in advance. The race estimating unit estimates the race of the subject person. Any known race estimating technique can be applied to the race estimating unit. The selecting unit selects the approximate equation stored in the approximate equation storing unit so as to associate with the estimated race. Further, in the twelfth aspect, the pupil color estimating unit estimates a pupil color based upon the specified skin color and using the selected approximate equation.

That a pupil color is different depending upon the race is based upon an experiential fact. Accordingly, estimating a pupil color by using the same approximate equation possibly degrades the precision, in the case where a different race becomes a subject. However, the twelfth aspect makes it possible to estimate a more suitable pupil color according to the race of the subject. Therefore, more natural pupil color can be estimated.

[Thirteenth Aspect]

The thirteenth aspect is further provided with an approximate equation storing unit, an environment estimating unit and a selecting unit in the above-mentioned each aspect. The approximate equation storing unit stores the approximate equation used for estimating a pupil color so as to associate with the environment. Such an approximate equation is an approximate equation obtained by the result of the statistical process shown in the eleventh aspect and is obtained in advance. The environment estimating unit estimates the environment in which this device operates or the environment in which the inputted image is captured. The environment estimating unit may estimate the environment according to any standard. For example, the environment estimating unit may estimate the environment based upon a used language, time zone, local information, phone number or the like set to an OS installed to this device or to the device itself. Further, the environment estimating unit may estimate the environment based upon the information attached to the captured image (e.g., EXIF or other header information). The selecting unit selects the approximate equation stored in the approximate equation storing unit so as to associate with the estimated environment. Further, in the thirteenth aspect, the pupil color estimating unit estimates a pupil color based upon the specified skin color and using the selected approximate equation.

That a pupil color is different depending upon the race is based upon an experiential fact. Further, that a race component is different depending upon the environment (such as a country or area) is also based upon an experiential fact. Therefore, there is a possibility that the race of the subject is different in the image captured in the different environment, so that estimating a pupil color by using the same approximate equation possibly degrades the precision. However, the thirteenth aspect makes it possible to estimate a more suitable pupil color according to the environment in which this device operates. Therefore, more natural pupil color can be estimated.

[Others]

The first to thirteenth aspects may be realized in such a manner that a program is executed by an information processing device. Specifically, the above-mentioned operations and effects may be obtained by a program for executing each process executed by each units in the first to thirteenth aspects to an information processing device or by a recording medium having the program recorded thereon. Further, the above-mentioned operations and effects may be obtained by a method wherein an information processing device executes each process executed by each units in the first to thirteenth aspects. Further, the first to thirteenth aspects may be provided at an imaging device such as a digital still camera or a digital video camera, a digital photo printer including a minilab machine, or other image processing device.

The present invention can estimate a color of a pupil in which a color contrast is considered for a skin color in an inputted image. Therefore, an original pupil color can be estimated even though the original pupil color is lost from an image due to the occurrence of a red-eye phenomenon or a gold-eye phenomenon.

DESCRIPTION OF THE PREFERRED EMBODIMENTS

Subsequently, a pupil color estimating device will be explained with reference to drawings. It should be noted that the following explanation about the pupil color estimating device is an illustration, so that its construction is not limited to the following explanation.

First Embodiment

[System Configuration]

Firstly explained is a pupil color estimating device 1a that is a first embodiment of the pupil color estimating device. The pupil color estimating device 1a has a CPU (central processing unit), main memory (RAM: Random Access Memory), auxiliary memory or the like, each of which is connected via a bus. The auxiliary memory is configured by using a nonvolatile memory unit. The nonvolatile memory unit here indicates a so-called ROM (Read-Only Memory: including EPROM (Erasable Programmable Read-Only Memory), EEPROM (Electrically Erasable Programmable Read-Only Memory), mask ROM or the like), FRAM (Ferroelectric RAM), hard disk or the like.

Figure 1:
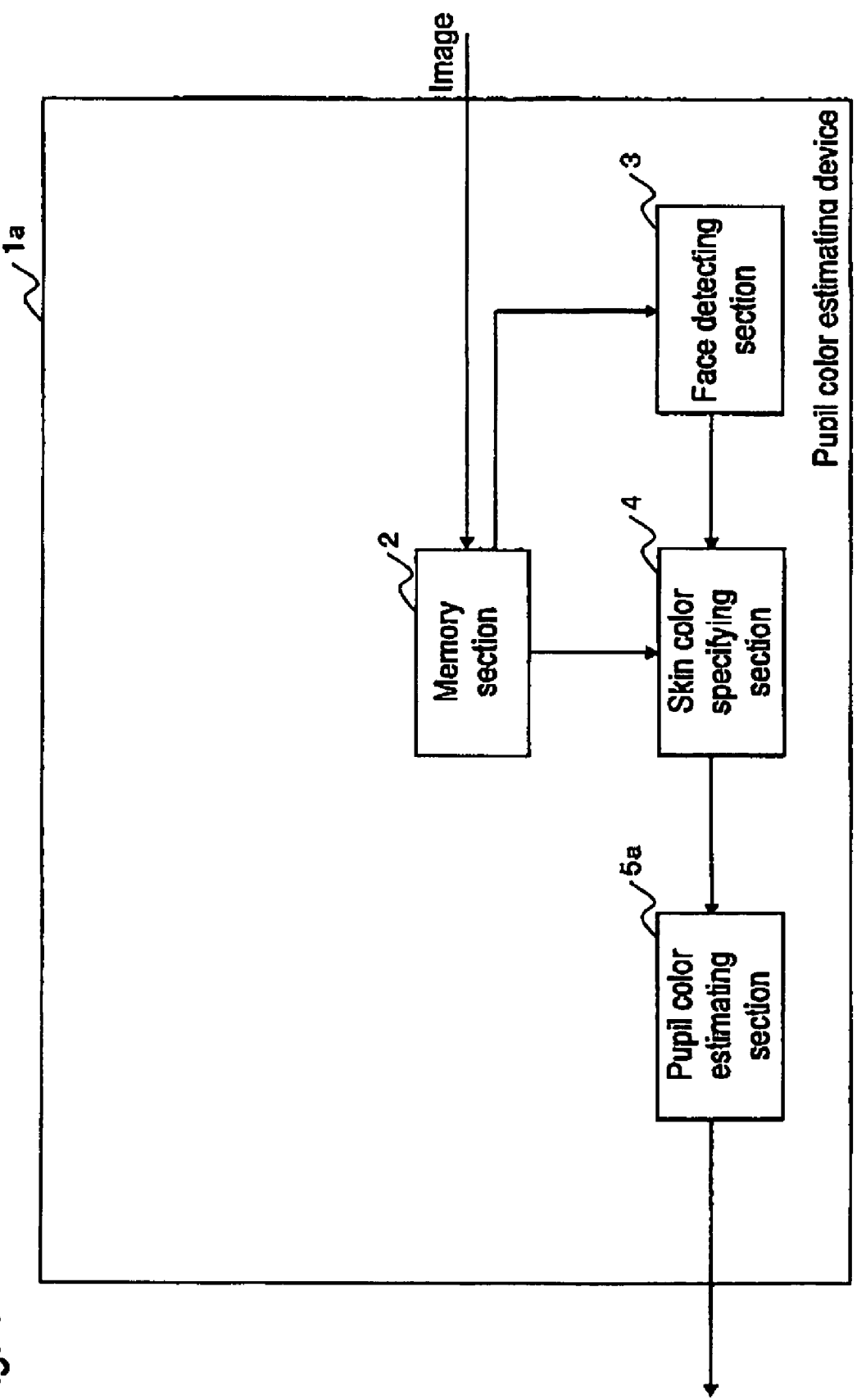
FIG. 1 shows an example of a functional block of a pupil color estimating device according to a first embodiment.

FIG. 1 is a diagram showing a functional block of the pupil color estimating device 1a. Various programs (OS, application, or the like) stored in the auxiliary memory is loaded to the main memory to be executed by the CPU, whereby the pupil color estimating device 1a functions as a device including a memory section 2, face detecting section 3, skin color specifying section 4 and pupil color estimating section 5a. A program is executed by the CPU, so that the face detecting section 3, skin color specifying section 4 and the pupil color estimating section 5a are realized. Further, each of the face detecting section 3, skin color specifying section 4 and the pupil color estimating section 5a may be configured as a dedicated chip. Moreover, some are suitable for a hardware and others are suitable for a software according to the content of a process executed by each processing section. Therefore, these may be mounted as a hybrid of a hardware and a software. Each functional section provided at the pupil color estimating device 1a will be explained hereinbelow.

[Memory Section]

The memory section 2 stores an image inputted to the pupil color estimating device 1a. The memory section 2 may be configured by using a so-called RAM or a so-called ROM.

The image inputted to the memory section 2 includes, for example, an image captured by an imaging device not shown, an image transmitted from an information processing device not shown via an interface, an image read from a recording medium not shown, or the like.

[Face Detecting Section]

Figure 2:
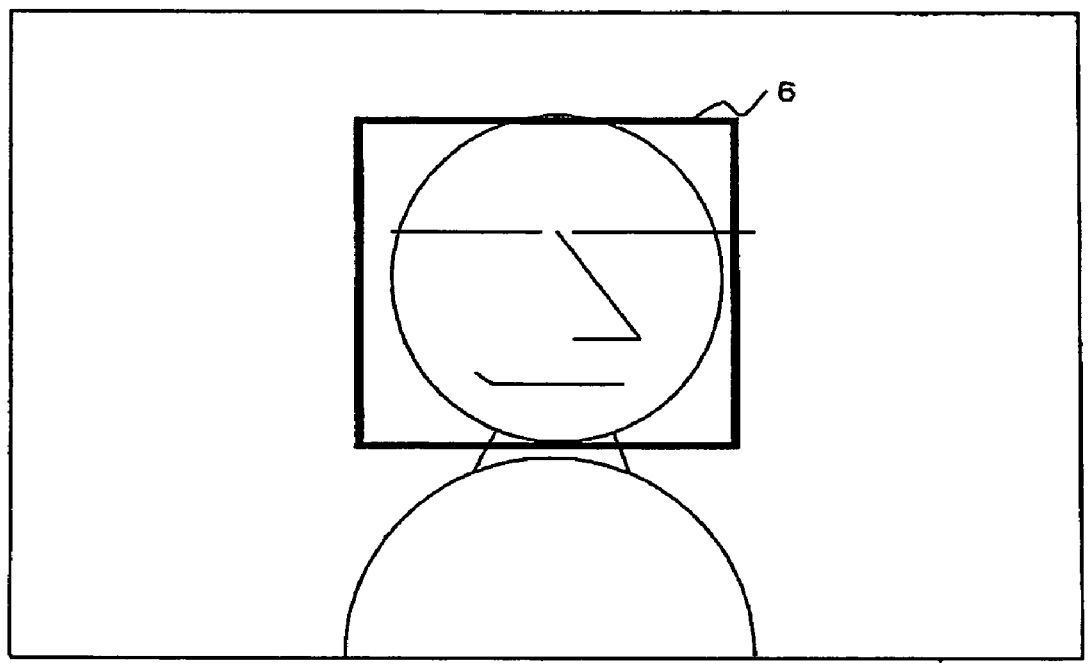
FIG. 2 shows a view of an example of a face rectangle.

The face detecting section 3 executes a face detecting process to an image, which is a subject to be processed by the pupil color estimating device 1a, among images stored in the memory section 2. In the face detecting process, the face detecting section 3 reads the image to be processed from the memory section 2, and a face rectangle 6 is detected from the read image. FIG. 2 is a view showing an example of a face rectangle (face rectangle 6). The face rectangle 6 is a rectangle including a face section of a subject person.

When detecting the face rectangle 6, the face detecting section 3 outputs face rectangle information. The face rectangle information is information showing a size or position of the face rectangle 6. For example, the face rectangle information shows the width of the face rectangle 6 and the coordinates at the upper-left corner. The other processing sections specify the position of the face of the subject person in the image to be processed by this face rectangle information.

The face detecting process by the face detecting section 3 may be configured, for example, to detect a face with a template matching using a reference template corresponding to an outline of a whole face. Further, it may be configured to detect a face with a template matching based upon components (eyes, nose, mouth or the like) of the face. Moreover, it may be configured to detect a face based upon the top of the hair on the head detected by a chroma-key process. Further, the face detecting section 3 may detect a region close to the skin color, thereby detecting this region as a face. Moreover, the face detecting section 3 may learn by a teacher signal by using a neutral network to detect a face-like region as a face. Further, the face detecting process by the face detecting section 3 may be realized by any other known methods.

[Skin Color Specifying Section]

The skin color specifying section 4 obtains a representative value of the skin color of the subject person from the region of the face rectangle 6 detected by the face detecting section 3. This process is called a skin color specifying process hereinbelow. The skin color specifying section 4 obtains, for example, statistics of a color value of the pixel included in the face rectangle 6 as a representative value in the skin color specifying process. More preferably, the skin color specifying section 4 is configured to obtain the statistics of a color value of a predetermined pixel among pixels included in the face rectangle 6.

Figure 3:
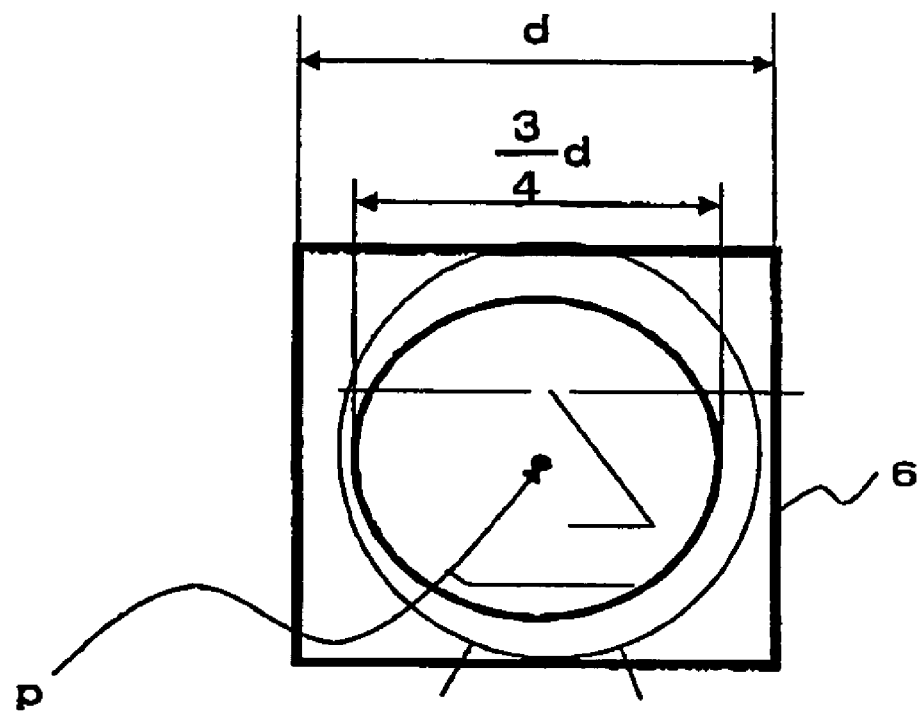
FIG. 3 shows a view of an example of a region specified upon obtaining a representative value of a skin color.

"The predetermined pixel" is, for example, a pixel included in the region specified from the face rectangle information of the face rectangle 6. More specifically, for example, it may be a pixel in the region geometrically specified from the face rectangle information of the face rectangle 6. FIG. 3 is a view showing an example of such a region. In FIG. 3, a region in a circle is specified as an example of such region, this circle having a diameter defined by ¾ of the width of the face rectangle 6 and the center defined by the center of the face rectangle 6 ("p" in FIG. 3).

Further, "the predetermined pixel" may be, for example, remaining pixels obtained by eliminating pixels that are causes of noise upon a skin color measurement among pixels included in the face rectangle 6. Examples of pixels that are causes of the noise include a face component (e.g., eyebrow, bulb of an eye, lip, nostril) or a shiny section of a skin.

Further, "the predetermined pixel" may be, for example, a pixel included inside of the face outline specified by a process such as an edge extraction, among pixels included in the face rectangle 6. Moreover, the specifying methods of the aforesaid "predetermined pixel" may be combined with each other according to need.

Then, the skin color specifying section 4 executes a statistical process based upon the predetermined pixel to obtain the representative value of the skin color of the subject person. The statistical process may be a simple process such as an intermediate value, average, mode or the like. Moreover, a process for eliminating a cause of noise by dividing a range from a histogram with a method such as $3\sigma$ may further be executed in the statistical process.

The skin color specifying section 4 may be configured to obtain the representative value of the skin color of the subject person by a method different from the above-mentioned methods upon executing the skin color statistical process. For example, the skin color specifying section 4 may be configured to obtain a color value of a specified pixel in the face rectangle 6 as the representative value.

[Pupil Color Estimating Section]

The pupil color estimating section 5a estimates the pupil color of the subject person based upon the representative value of the skin color obtained by the skin color specifying section 4. The pupil color estimated by the pupil color estimating section 5a is referred to as "pupil estimated color" hereinbelow. The pupil color estimating section 5a obtains the pupil estimated color based upon the transform function (approximate equation) of each color of RGB. This approximate equation indicates a correlation between the skin color in the image of the subject person and the pupil color in the image that is recognized to have no abnormality such as a red-eye occurring. This approximate equation is an equation pre-obtained as a pre-treatment. Firstly, the derivation of this approximate equation will be explained.

Firstly collected as a sample image are a great number of images that are recognized to have no abnormality occurring on an image of a pupil such as a red-eye or gold-eye (i.e., "an image having no sense of incongruity", "an image recognized that the pupil of the subject person is normally imaged"). A statistical process is performed to these sample images, thereby obtaining a correlation between the skin color of the subject person in the image and the pupil color in the image recognized to have no abnormality. Specifically, a representative value $Sn$ ($Srn$, $Sgn$, $Sbn$) of the skin color of the subject person in each sample image and a representative value $En$ ($Ern$, $Egn$, $Ebn$) of the normal pupil color of this person are firstly obtained. These representative values are obtained by the same manner as, for example, the statistical process executed by the skin color specifying section 4. These representative values may be obtained by any other methods.

Subsequently, it is supposed that, for example, the transform function of each color can be approximated by a first-degree equation. Specifically, it is supposed that the transform function of each color is represented by the following equation.

$$Ec = Ac \cdot Sc + Bc \qquad \text{[Equation 1]}$$

In this equation, "c" represents any one of rgb. Further, "A" and "B" represent a coefficient. In the pre-treatment, the values of the coefficients "A" and "B" are determined by a least squares method based upon the representative value $Sn$ of the skin color and the representative value $En$ of the normal pupil color in each sample image. As described above, approximate equations with respect to each color of RGB, i.e., three approximate equations for estimating a normal pupil color from a skin color are obtained in the pre-treatment.

Subsequently explained is a method for obtaining the pupil estimated color using the aforesaid approximate equation. The pupil color estimating section 5a substitutes the representative value of the skin color obtained by the skin color specifying section 4 with respect to the pre-obtained approximate equation, to thereby estimate a normal pupil color (i.e., pupil estimated color) of the subject.

The aforesaid explanation is made about the case where the approximate equation of the first degree equation is obtained in the pre-treatment, but it is needless to say that the pre-treatment and the process at the pupil color estimating section 5a may be executed based upon the approximate equation other than the first degree equation.

Operational Example

Figure 4:
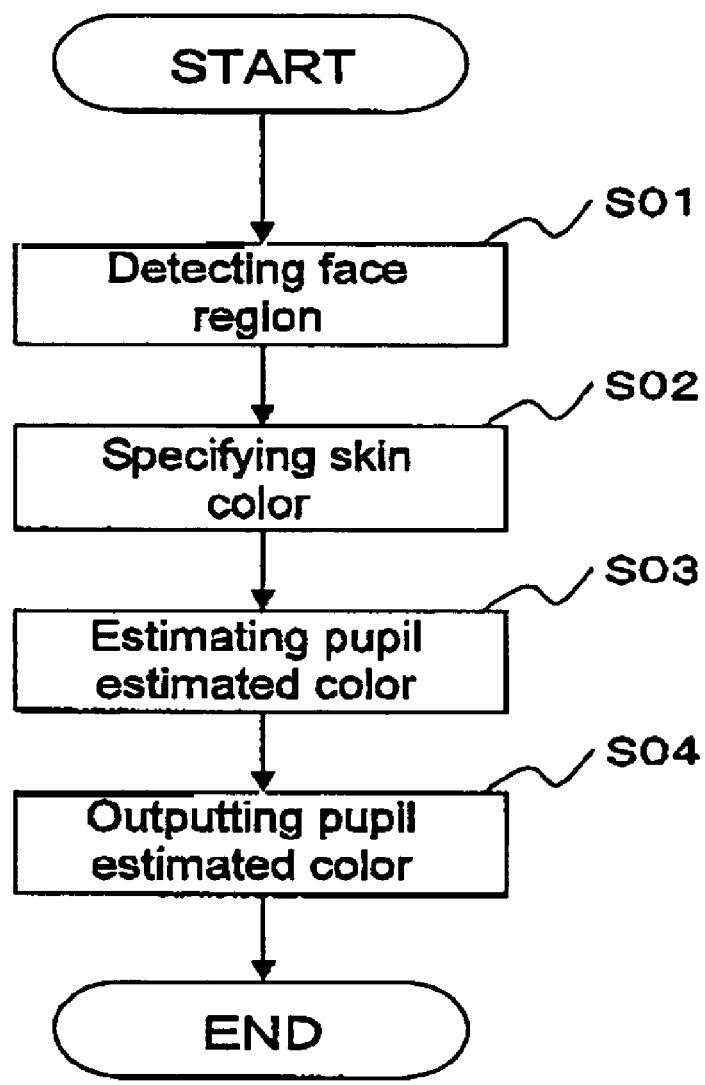
FIG. 4 shows a flowchart of an operational example of the pupil color estimating device according to the first embodiment.

FIG. 4 is a flowchart showing an operational example of the pupil color estimating device 1a. The operational example of the pupil color estimating device 1a will be explained with reference to FIG. 4.

Firstly, the face detecting section 3 detects the face of the subject person from the image to be processed (S01). Specifically, it detects the face rectangle 6 from the image to be processed to obtain the face rectangle information. Then, the skin color specifying section 4 specifies the representative value of the skin color based upon the face rectangle information obtained by the face detecting section 3 (S02). Subsequently, the pupil color estimating section 5a estimates the pupil color of the person whose face is detected by the face detecting section 3, by using the representative value of the skin color obtained by the skin color specifying section 4 and the pre-obtained approximate equation, thereby obtaining the pupil estimated color (S03). Then, the pupil color estimating section 5a outputs the estimated pupil estimated color (S04).

[Operation/Effect]

The pupil color estimating device 1a estimates the normal color of the pupil of the subject person in the inputted image, i.e., the pupil color that should be shown in the image, from the skin color of the person based upon the pre-obtained approximate equation. Therefore, even though a problem such as a red-eye or gold-eye is caused on the inputted image, the normal pupil color of the subject person can be estimated independently of the abnormal pupil color such as the red-eye or gold-eye. Accordingly, a user can judge whether a correction should be made to the pupil section of the inputted image based upon the thus estimated pupil estimated color. Specifically, the user easily judges whether the correction is made to the pupil section of the inputted image by comparing the pupil color of the inputted image and the pupil estimated color. Further, the user can correct the pupil section of the inputted image based upon the thus estimated pupil estimated color, resulting in being capable of obtaining an image having no sense of incongruity and having a normal color of the pupil.

The pupil color estimating device 1a described above may be applied to, for example, an imaging device such as a digital still camera or a video camera or to an information processing device provided with such an imaging device. The imaging device or the like can judge whether an abnormality such as a red-eye or gold-eye occurs on the captured image based upon the outputted pupil estimated color, since the pupil color estimating device 1a is applied thereto. Similarly, applying the pupil color estimating device 1a makes it possible to obtain a color to which the pupil image should be corrected (i.e., pupil estimated color). Accordingly, these imaging devices or the like can make a suitable correction, make an alarm to the user or present the pupil estimated color to the user, according to the judgement thereof.

Second Embodiment

[System Configuration]

Figure 5:
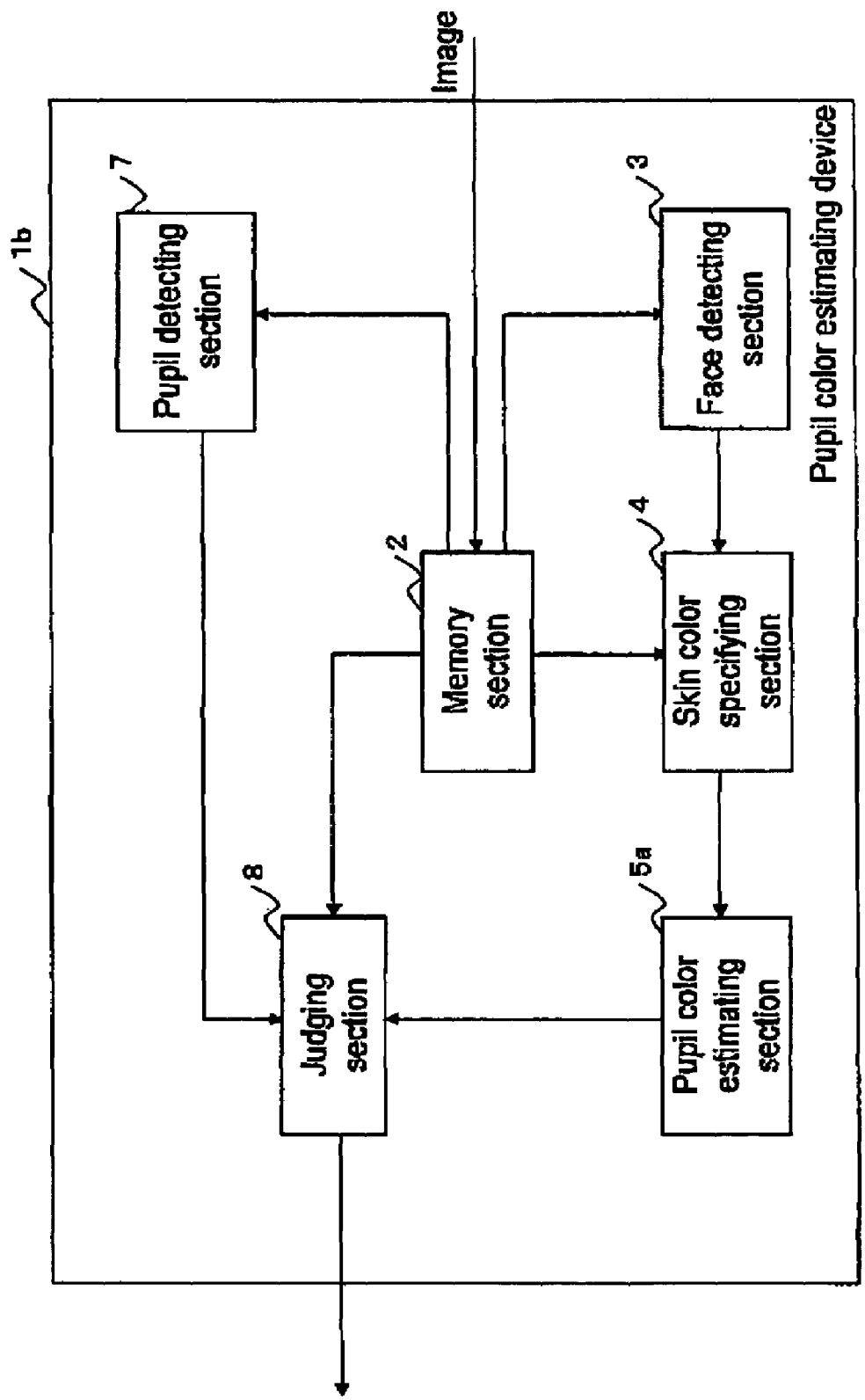
FIG. 5 shows a view of an example of a functional block of a pupil color estimating device according to a second embodiment.

Subsequently explained is a pupil color estimating device 1b that is the second embodiment of the pupil color estimating device. FIG. 5 is a view showing an example of a functional block of the pupil color estimating device 1b. The pupil color estimating device 1b is different from the pupil color estimating device 1a in that it is further provided with a pupil detecting section 7 and a judging section 8. The different points of the pupil color estimating device 1b from the pupil color estimating device 1a will be explained hereinbelow. It should be noted that the pupil detecting section 7 and the judging section 8 are realized in such a manner that a program is executed by a CPU. Further, each of the pupil detecting section 7 and the judging section 8 may be configured as a dedicated chip. Moreover, each processing section may be mounted as a hybrid of a hardware and a software.

[Pupil Detecting Section]

The pupil detecting section 7 executes a pupil detecting process for an image that is a subject to be processed by the pupil color estimating device 1b, among images stored in the memory section 2. In the pupil detecting process, the pupil detecting section 7 reads from the memory section 2 the image in the face rectangle 6 detected by the face detecting section 3 among images that are subjects to be processed, and detects the pupil region from the read image. The pupil region means an image including the pupil of the subject person whose face is detected by the face detecting section 3.

The pupil detecting process by the pupil detecting section 7 may be configured to detect a pupil with a template matching using a reference template corresponding to a shape of the pupil. In this case, the pupil detecting section 7 may be configured to select a template corresponding to the diameter of the pupil estimated from the size of the face rectangle 6 detected by the face detecting section 3, to thereby execute the pupil detecting process. Further, in this case, the pupil detecting section 7 may be configured to limit the region where the template matching is executed by estimating a rough pupil position from the position of the detected face rectangle 6. Further, the pupil detecting process by the pupil detecting section 7 may be realized by any methods other than the template matching. For example, the pupil detecting section 7 may be configured to detect the pupil by tracing the outline of the pupil after extracting an edge with respect to the inputted image. When detecting the pupil by the pupil detecting process, the pupil detecting section 7 outputs information showing the pupil region (hereinafter referred to as "pupil region information").

[Judging Section]

The judging section 8 specifies the color of each pixel showing the pupil in the inputted image based upon the outputted pupil region information by the pupil detecting section 7. Specifically, in the case where an abnormality such as a red-eye or gold-eye occurs on the inputted image, for example, the judging section 8 specifies the color in the image having the abnormality occurring.

Subsequently, the judging section 8 judges the pupil region based upon the pupil region information, thereby judging, for each pixel included in the pupil region, whether the color possessed by the pixel is a normal color or not for the pupil. Specifically, the judging section 8 makes the aforesaid judgement by comparing the color specified in the inputted image and the pupil estimated color estimated by the pupil color estimating section 5a.

The judging section 8 obtains a feature amount D for the pupil estimated color and the color of each pixel in the pupil region, for example, based upon the following equation. In this case, the judging section 8 obtains the feature amount D showing a degree of red for the pupil estimated color and the color in each pixel, thereby judging whether the red-eye phenomenon is present or not in particular.

$$D = \frac{r}{r+g+b}$$ [Equation 2]

The judging section 8 judges the degree of red for each pixel by comparing the feature amount D for the pupil estimated color and the feature amount D for the color in each pixel in the pupil region. Then, the judging section 8 judges that the abnormality (in this case, the red-eye phenomenon) occurs in this inputted image, in the case where pixels having the feature amount D greater than the feature amount D in the pupil estimated color are present in the pupil region at a higher ratio than the predetermined ratio.

It should be noted that the feature amount D used for the judgement by the judging section 8 may be obtained based upon the other definition. For example, the judging section 8 may be configured to obtain a feature amount D' for judging the degree of the gold-eye for making a comparison and judgement.

Operational Example

Figure 6:
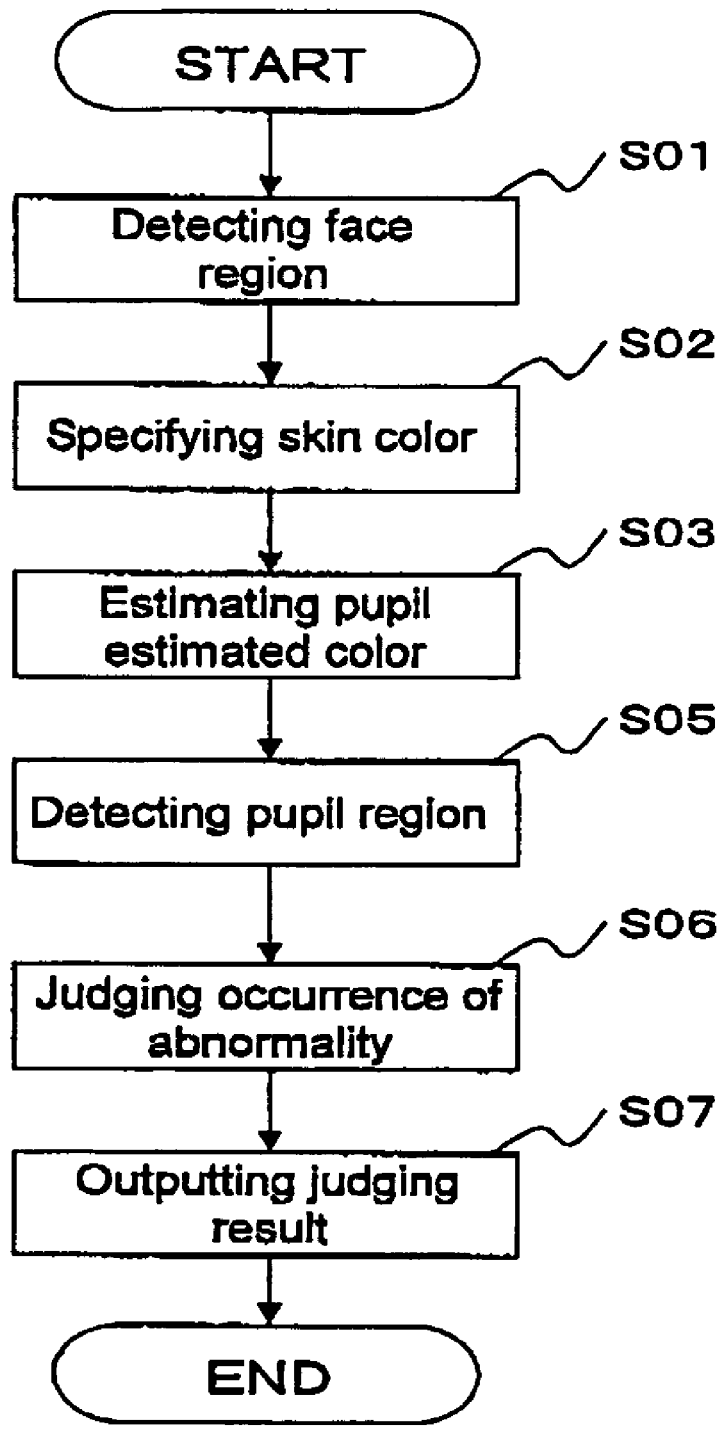
FIG. 6 shows a flowchart of an operational example of the pupil color estimating device according to the second embodiment.

FIG. 6 is a flowchart showing an operational example of the pupil color estimating device 1b. The operational example of the pupil color estimating device 1b will be explained with reference to FIG. 6. It should be noted that, among operations of the pupil color estimating device 1b, the process same as that of the pupil color estimating device 1a is given same numeral as that in the flowchart of FIG. 4 to omit its explanation.

In the pupil color estimating device 1b, after the pupil color estimating section 5a estimates the pupil estimated color (S03), the pupil detecting section 7 detects the pupil region (S05). Then, the judging section 8 judges whether an abnormality such as a red-eye or gold-eye occurs on the pupil in the inputted image based upon the pupil estimated color estimated by the pupil color estimating section 5a and the color of each pixel in the pupil region detected by the pupil detecting section 7 (S06). Then, the judging section 8 outputs the judging result (S07). It should be noted that the process for detecting the pupil region by the pupil detecting section 7 (S05) may be executed before the process for estimating the pupil estimated color by the pupil color estimating section 5a (S03).

[Operation/Effect]

The pupil color estimating device 1b judges whether an abnormality such as a red-eye phenomenon or gold-eye phenomenon occurs on the image of the pupil in the inputted image based upon the pupil estimated color estimated based upon the same process as the pupil color estimating device 1a. Therefore, a user can obtain an objective judgement as to whether the abnormality such as the red-eye phenomenon or gold-eye phenomenon occurs on the inputted image. Accordingly, the user can easily judge whether a correction should be made or not to the inputted image, in the case where a correction is made to the image that is recognized to have an abnormality, for example. Similarly, in the case where the user desires to re-obtain the inputted image when the abnormality occurs, he/she can easily judge whether the inputted image should be re-obtained or not (for example, whether a process such as image-capture or download should be performed again).

The pupil color estimating device 1b described above may be applied to, for example, an imaging device such as a digital still camera or a video camera or to an information processing device provided with such imaging device, like the pupil color estimating device 1a. Whether an abnormality such as a red-eye or gold-eye occurs on the captured image can be judged by applying the pupil color estimating device 1b, and according to this judgement, a suitable correction can be made or an alarm can be given to the user.

Modified Example

The judging section 8 may be configured to make a judgement independently for each of the right and left pupils of the subject person and output the judging result for each pupil.

Further, in the case where faces of plural subject persons are detected in the inputted image, the pupil color estimating device 1b may be configured to execute the judging process for all persons, or execute the judging result for only the subject person satisfying the predetermined condition (for example, a person having the face rectangle 6 greater than the predetermined size, a person positioned at the vicinity of the center of the screen, a specific person judged by a face authentication).

Third Embodiment

[System Configuration]

Figure 7:
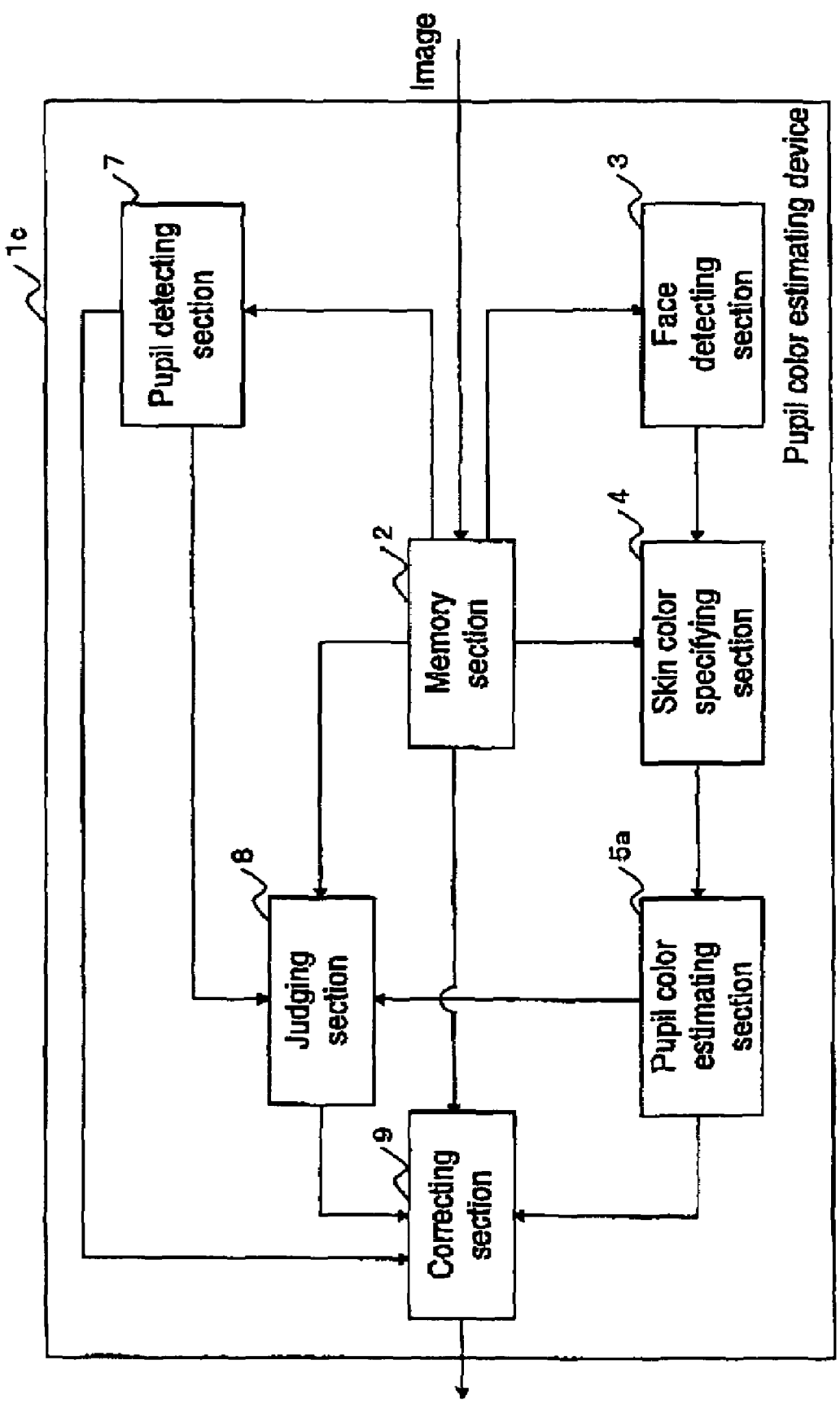
FIG. 7 shows a view of a functional block of a pupil color estimating device according to a third embodiment.

Subsequently explained is a pupil color estimating device 1c that is the third embodiment of the pupil color estimating device. FIG. 7 is a view showing an example of a functional block of the pupil color estimating device 1c. The pupil color estimating device 1c is different from the pupil color estimating device 1b in that it is further provided with a correcting section 9. The different points of the pupil color estimating device 1c from the pupil color estimating device 1b will be explained hereinbelow. It should be noted that the correcting section 9 is realized in such a manner that a program is executed by a CPU. Further, the correcting section 9 may be configured as a dedicated chip. Moreover, each processing section may be mounted as a hybrid of a hardware and a software.

[Correcting Section]

The correcting section 9 executes a correcting process based upon the judging result by the judging section 8. Specifically, the correcting section 9 executes the correcting process in the case where an abnormality is judged to occur on the pupil image in the inputted image by the judging section 8. The correcting section 9 corrects the color of the pixel in the pupil region detected by the pupil detecting section 7 based upon the pupil estimated color estimated by the pupil color estimating section 5a. One example of the correcting process executed by the correcting section 9 will be explained hereinbelow.

The correcting section 9 replaces the color of the pixel that is the subject to be corrected with the pupil estimated color while keeping its brightness. Here, the correcting section 9 obtains the brightness Y of the pixel to be corrected based upon the following equation.

$$Y=0.299R+0.587G+0.114B \quad \text{[Equation 3]}$$

It should be noted that each value of R, G and B is an integer from 0 to 255. The correcting section 9 obtains the RGB value (hereinafter referred to as Nr, Ng, Nb) from which the brightness same as the brightness Y of the pixel to be corrected can be obtained, while keeping the ratio of each value of R, G and B in the pupil estimated color (i.e., the values of Er, Eg, Eb obtained from the approximate equation). The correcting section 9 executes the correcting process by giving thus obtained values of Nr, Ng and Nb to the pixel to be corrected.

Operational Example

Figure 8:
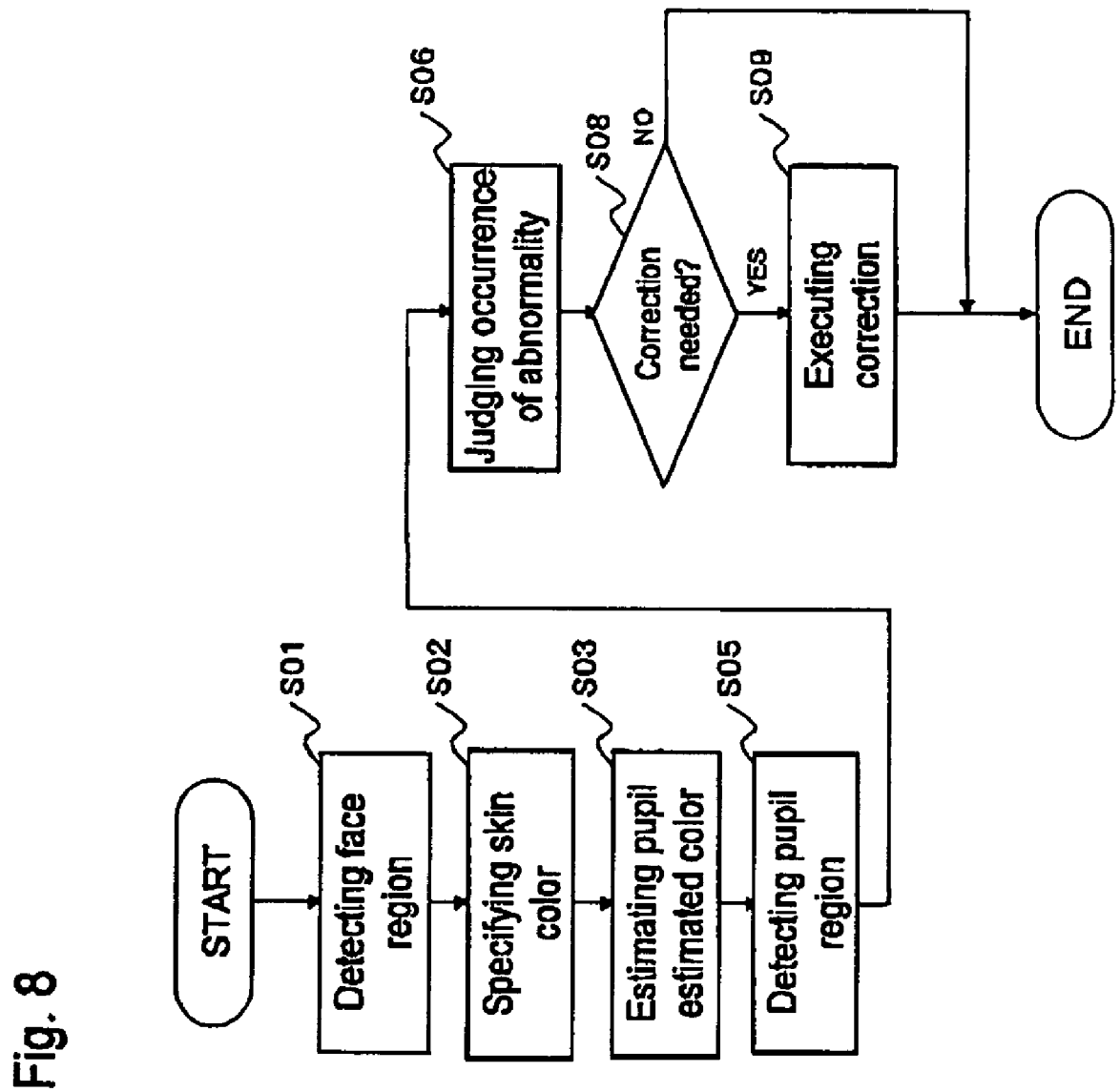
FIG. 8 shows a flowchart of an operational example of the pupil color estimating device according to the third embodiment.

FIG. 8 is a flowchart showing an operation example of the pupil color estimating device 1c. The operational example of the pupil color estimating device 1c will be explained with reference to FIG. 8. It should be noted that, among operations of the pupil color estimating device 1c, the process same as that of the pupil color estimating device 1b is given same numeral as that in the flowchart of FIG. 6 to omit its explanation.

In the pupil color estimating device 1c, after the judging section 8 judges about the occurrence of the abnormality (S06), the correcting section 9 judges whether the correcting process is necessary or not based upon the judging result. In the case where the correcting process is necessary (S08-YES), i.e., in the case where the judging section 8 judges that the abnormality occurs on the pupil image, the correcting section 9 executes the correcting process (S09), and then, the process is ended. On the other hand, in the case where the correcting process is unnecessary (S08-NO), i.e., in the case where the judging section 8 judges that the abnormality does not occur on the pupil image, the process is ended.

[Operation/Effect]

In the pupil color estimating device 1c, whether the correcting process is required or not to the pupil section of the inputted image is judged based upon the judging result of the judging process by the judging section 8 executed based upon the same process as the pupil color estimating device 1b. Then, according to this judging result, the correcting process using the pupil estimated color estimated based upon the same process as the pupil color estimating device 1a is executed. Therefore, the pupil color of the subject person is corrected to a normal color without troubling the user with respect to the image in which the abnormality such as a red-eye phenomenon or gold-eye phenomenon occurs.

Further, in the pupil color estimating device 1c, a color based upon the pupil estimated color is determined, while maintaining the brightness of the pixel to be corrected in the inputted image, upon executing the correcting process. Specifically, the color replacement is executed with the ratio of RGB of the pupil estimated color or the original pixel brightness maintained. Therefore, more natural correcting process can be executed, different from the case of simply replacing with the pupil estimated color. Specifically, it is possible to naturally express a spherical shape of a bulb or a sense of wettability on the surface of the bulb in the image of the pupil after the correction without losing an effect due to a natural phenomenon caused on the surface of the pupil such as a so-called catch light. Accordingly, high-quality image correction can be realized.

Modified Example

The pupil color estimating device 1c may be configured to omit the judging section 8. In this case, the correcting section 9 is configured to execute the correcting process independently of the judging result by the judging section 8. In this case, it may be configured, for example, that the correcting process is executed based upon the judgement by a user.

By this configuration, the correcting process is executed even to a pupil having the gold-eye phenomenon or a pupil giving a sense of incongruity due to the reason of too black, even though the judging section 8 is configured to judge only about the red-eye phenomenon, for example. Accordingly, it is possible to cope with the abnormality that cannot be judged by the judging section 8.

Further, the judging section 8 may be configured to make a judgement independently for each of the right and left pupils of the subject person and execute the correcting process to only the pupil that the correction is necessary. This configuration prevents the correcting process from being executed to the pupil that should not originally be corrected, and enables a high-speed process.

Further, in the case where faces of plural subject persons are detected in the inputted image, the pupil color estimating device 1c may be configured to execute the judging process for all persons, or execute the judging result for only the subject person satisfying the predetermined condition (for example, a person having the face rectangle 6 greater than the predetermined size, a person positioned at the vicinity of the center of the screen, a specific person judged by a face authentication).

Fourth Embodiment

[System Configuration]

Figure 9:
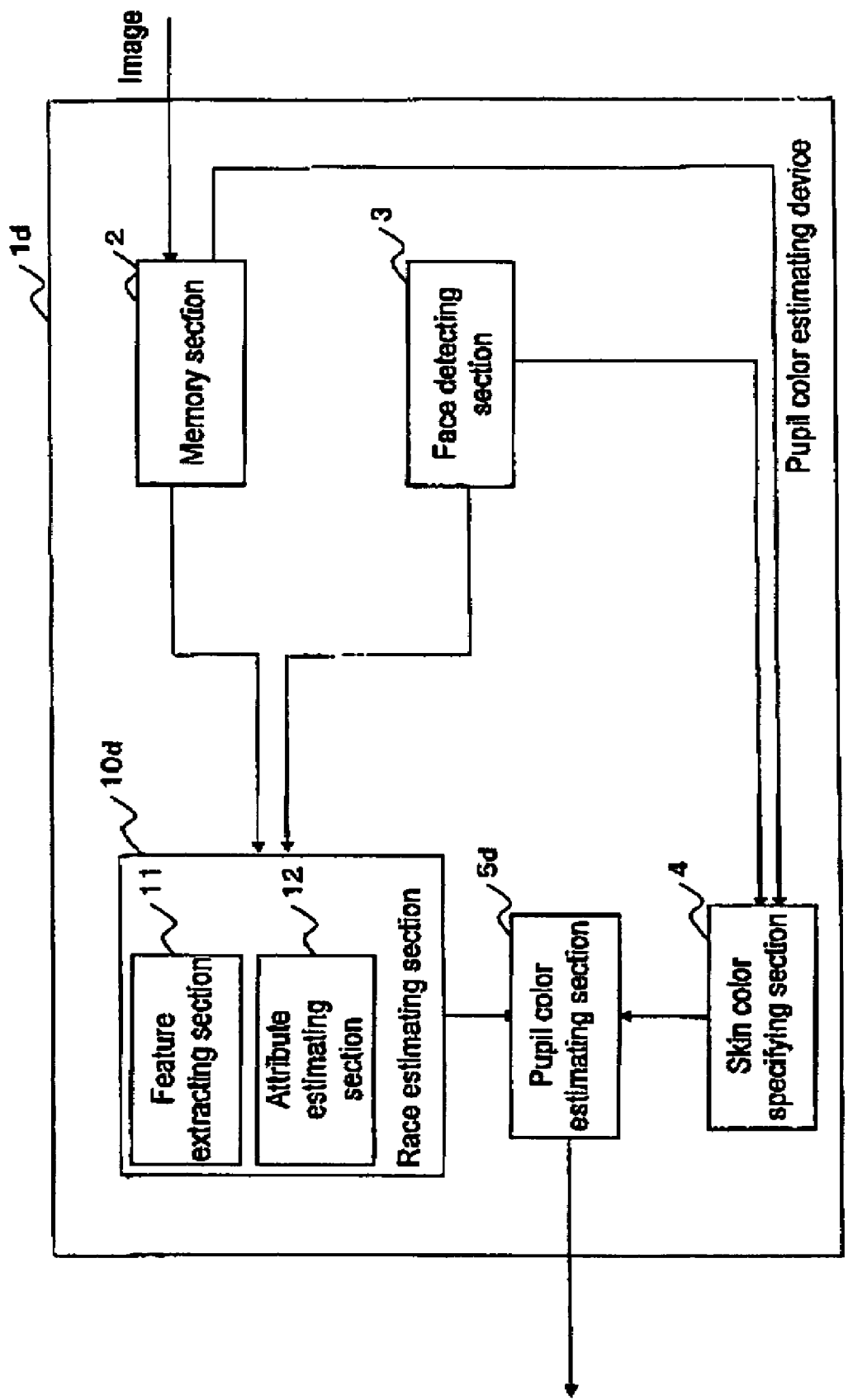
FIG. 9 shows a view of an example of a functional block of a pupil color estimating device according to a fourth embodiment.

Subsequently explained is a pupil color estimating device 1d that is the fourth embodiment of the pupil color estimating device. FIG. 9 is a view showing an example of a functional block of the pupil color estimating device 1d. The pupil color estimating device 1d is different from the pupil color estimating device 1a in that it is further provided with a race estimating section 10. Further, the pupil color estimating device 1d is also different from the pupil color estimating device 1a in that it is provided with a pupil color estimating section 5d instead of the pupil color estimating section 5a. It should be noted that the pupil color estimating section 5d and the race estimating section 10 are realized in such a manner that a program is executed by a CPU. Further, the pupil color estimating section 5d and the race estimating section 10 may be configured as a dedicated chip. Moreover, each processing section may be mounted as a hybrid of a hardware and a software.

[Race Estimating Section]

The race estimating section 10 estimates which race the person's face detected by the face detecting section 3 belongs to by using an image. The race estimating section 10 may be realized by any technique, so long as it is a technique for estimating the race of the subject from the image. Explained hereinbelow is a specific example of a race estimating technique applicable to the race estimating section 10.

The race estimating section 10 obtains a feature amount with respect to the face detected by the face detecting section 3, and performs a pattern recognition based upon the feature amount to thereby estimate the attribute. In order to realize the process described above, the race estimating section 10 includes a feature extracting section 11 and attribute estimating section 12. Each process executed by each section will be explained hereinbelow.

[[Feature Extracting Section]]

At first, the feature extracting section 11 sets plural features in the face detected by the face detecting section 3 (feature setting process). Then, the feature extracting section 11 obtains a feature amount of each feature as the feature amount of the face of this subject based upon the features set in the feature setting process (feature amount obtaining process). The feature setting process and the feature amount obtaining process will be explained hereinbelow.

{[[Feature Setting Process]]}

In the feature setting process, the feature extracting section 11 firstly detects organs of the detected face. The organs of the face mean, for example, eyes, nose, nostrils, mouth (lip), eyebrows, chin, forehead or the like. The feature extracting section 11 may detect any organs in the face and may detect plural organs. For example, the feature extracting section 11 is configured to detect both eyes and mouth in the face of the subject.

Then, the feature extracting section 11 converts the detected face image into a gray scale image. Further, the feature extracting section 11 executes an angular normalization or size normalization of the detected face image based upon the positional relationship of the organs of the detected face. These processes are collectively referred to as a preprocess. Further, the process for converting the image into a gray scale may be executed during the process at the face detecting section 3 or at any time during the feature setting process.

Subsequently, the feature extracting section 11 sets positions of the plural features based upon the positions of the organs (hereinafter referred to as "fixation point", e.g., the point showing both eyes and mouth) in the detected face. The feature extracting section 11 sets features densely at the section close to the fixation point while roughly at the section away from the fixation point.

Figure 10B:
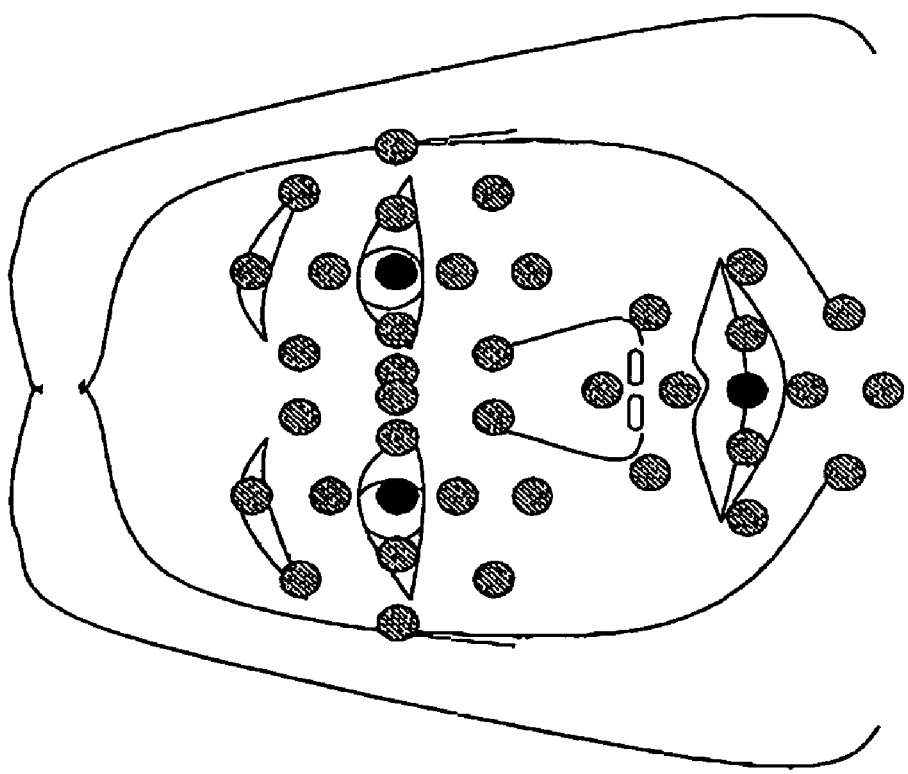
FIG. 10 shows an example of setting features.
Figure 10A:
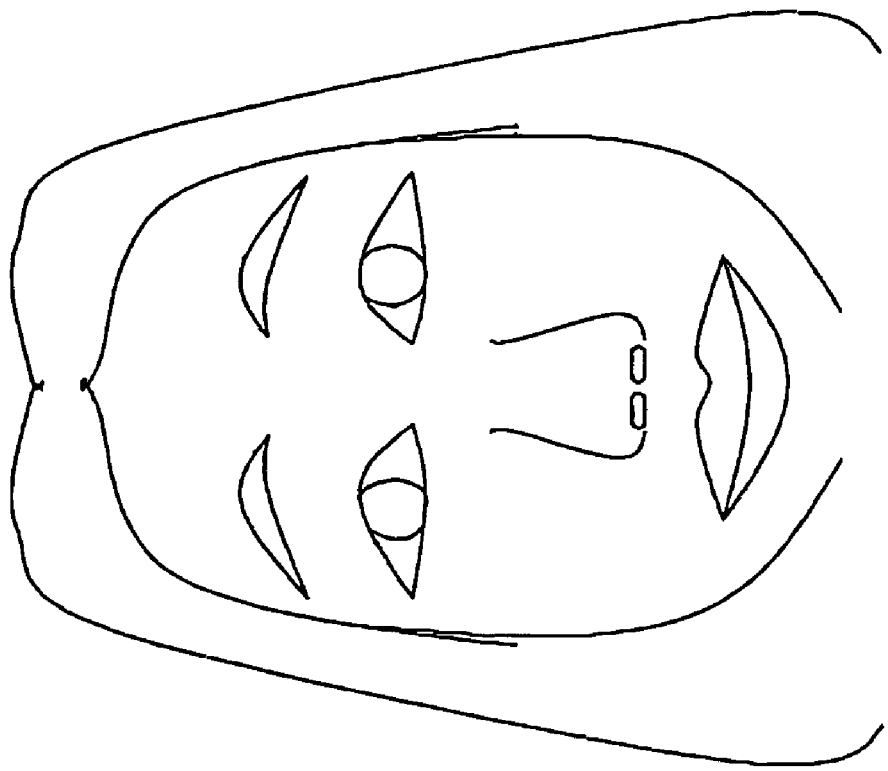

FIG. 10A is a view showing the face of the subject detected by the face detecting section 3. FIG. 10B is a view showing examples of plural features set by the feature setting process. In FIG. 10B, black-painted circles indicate fixation points, while slanted circles indicate features set based upon the fixation points. The fixation points may be handled as features in the feature amount obtaining process explained below.

The feature setting process described above can be realized by, for example, applying the Retina sampling disclosed in the following thesis.

F. Smeraldi and J. Bigun, "Facial features detection by saccadic exploration of the Gabor decomposition", International Conference on Image Processing, IPC-98, Chicago, October 4-7, volume 3, pages 163-167, 1998.

{[[Feature Amount Obtaining Process]]}

Figure 11:
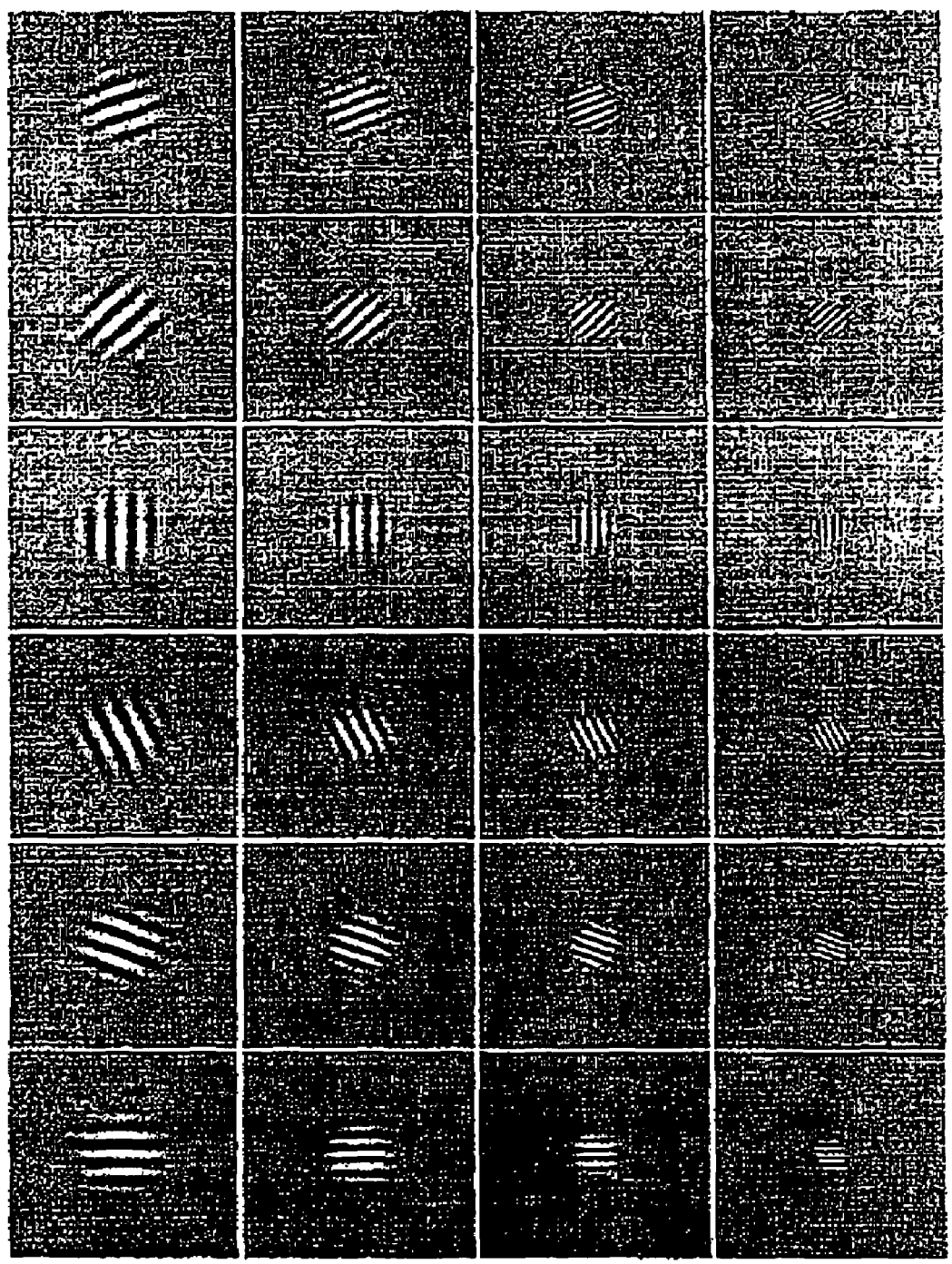
FIG. 11 shows an example of the Gabor filter.

In the feature amount obtaining process, the feature extracting section 11 folds the Gabor filter to each feature set by the feature setting process. Specifically, the feature extracting section 11 executes the Gabor Wavelets Transformation (GWT) to each feature. FIG. 11 is an example (real part) of the Gabor filter used in the feature amount obtaining process. The feature extracting section 11 obtains as the feature amount the periodicity and directivity of the concentration feature in the vicinity of the feature by folding plural Gabor filters having the resolution and orientation changed as shown in FIG. 11.

The equation 4 represents the Gabor filter. In the use of the Gabor filter, changing the value of k and θ in the equation makes it possible to obtain optional periodicity and directivity as a feature amount from the concentration feature.

$$\psi_{k,\theta}(x, y) = \frac{k^2}{\sigma^2} \exp\left[-\frac{k^2(x^2 + y^2)}{2\sigma^2}\right].$$ [Equation 4]

$$\{\exp[ik(x\cos\theta + y\sin\theta)] - \exp(-\frac{\sigma^2}{2})\}$$

The feature extracting section 11 gives the feature amount of each feature obtained by the feature amount obtaining process to the attribute estimating section 12. It should be noted that the feature extracting section 11 may be configured to perform the process with respect to all faces satisfying a predetermined condition among faces detected by the face detecting section 3. The predetermined condition means a condition such as a face having a size greater than a predetermined size, a predetermined position (e.g., a region at the center of the image), a face with a predetermined direction (e.g., facing frontward) or the like.

[[Attribute Estimating Section]]

The attribute estimating section 12 estimates attribute information of the subject detected by the face detecting section 3 based upon the feature amount of each feature given from the feature extracting section 11. The attribute information is information relating to this person including, for example, a race, age, sex or the like as an item. The attribute estimating section 12 estimates the attribute information of the subject by inputting the feature amount of each feature to a discriminator of a pattern recognition in which the learning process is completed in advance. The attribute estimating section 12 executes the process by using Support Vector Machine (SVM) as a discriminator of a pattern recognition. The Support Vector Machine will be explained hereinbelow by taking the case of estimating the race in the attribute information as an example.

The Support Vector Machine is a technique wherein a hyperplane passing through the center of the learning data belonging to two classes is defined as a border of the discrimination, thereby performing a pattern recognition. The discriminator in the Support Vector Machine uses the discrimination function represented by the equation 5, thereby estimating which class the inputted data (the feature amount at all features here) belongs to.

$$f(x) = \sum_{l=1}^{l} a_i y_i K(x, x_i) + b \quad \text{[Equation 5]}$$

In the equation 5, l represents the number of the learning data sorted by the learning process, i.e., the number of the learning data used for the attribute estimating process by the attribute estimating section 12. $\alpha_i$ represents Lagrange multiplier. $x_i$ and $y_i$ represent the learning data. $y_i$ has either one of "−1" or "1", showing which class $x_i$ belongs to. b represents a bias term, i.e., parameter. These values are determined by the learning process, whereby the attribute estimating section 12 stores the result of the learning process.

Moreover, in the equation 5, K represents a kernel function. There has been proposed a non-linear expansion of the Support Vector Machine that high-dimensionally maps the inputted data in an on-linear manner by using the kernel function. This makes it possible to construct a discriminator more effective for the actual problem. The representative kernel functions described above include a polynomial kernel (see equation 6) or Gaussian kernel (see equation 7) or the like. Any kernel function may be applied in the attribute estimating section 12.

$$K(x, x_i) = (x^T \cdot x_i + 1)^p \quad \text{[Equation 6]}$$

$$K(x, x_i) = \exp\left(-\frac{\|x - x_i\|^2}{\sigma^2}\right) \quad \text{[Equation 7]}$$

Figure 12:
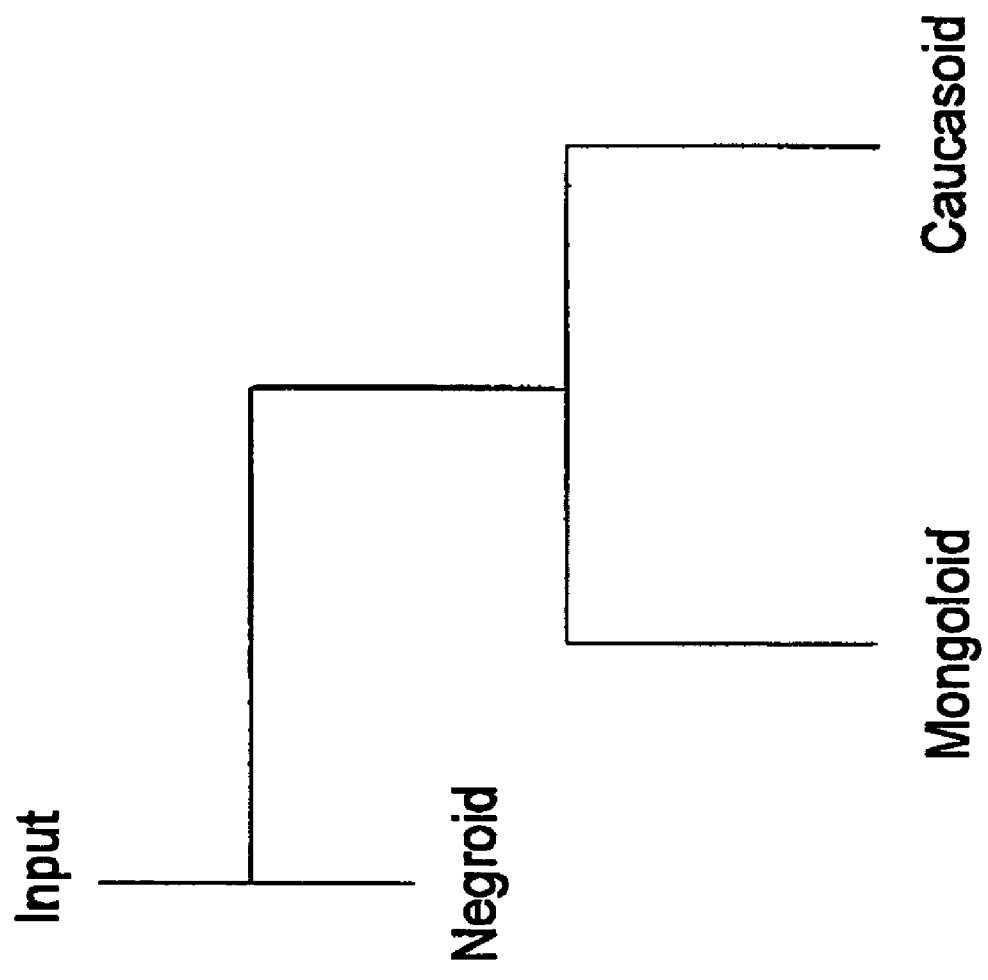
FIG. 12 shows an example of a binary tree search.

The Support Vector Machine is a learning method that composes a discriminator discriminating two classes. In order to discriminate (estimate) plural races (more than three races), plural Support Vector Machines are required to be combined. The attribute estimating section 12 applies a binary tree search, thereby realizing a multi-clustering using the Support Vector Machine. FIG. 12 is a view showing an example of a binary tree search applied for the race estimating process in the attribute estimating section 12. The explanation is made here by taking, as an example, a process for estimating which race of the subject is, Caucasoid, Negroid or Mongoloid. It may be configured to include other races as a candidate according to the design.

The attribute estimating section 12 firstly estimates whether the subject person is the Negroid or not by using the Support Vector Machine. In the case where the subject person is estimated not to be the Negroid, the attribute estimating section 12 then estimates whether the subject person is the Mongoloid or not (or the Caucasoid or not). The attribute estimating section 12 performs the estimating process about each term of the attribute information other than the race, i.e., age or sex, by similarly executing the binary tree search. Then, the attribute estimating section 12 gives the estimated attribute information to the pupil color estimating section 5d.

[Pupil Color Estimating Section]

The pupil color estimating section 5d estimates the pupil color of this subject person based upon the representative value of the skin color obtained by the skin color specifying section 4 and the attribute information obtained by the race estimating section 10. The process executed by the pupil color estimating section 5d will be specifically explained hereinbelow.

The approximate equation (corresponding to the equation 1) associated with each race is obtained in advance. Specifically, a sample image including the subject of each race is prepared as each sample image, whereby the approximate equation corresponding to each race is obtained. Then, the approximate equation corresponding to each race is stored by the pupil color estimating section 5d. When the pupil color of the subject is estimated, the pupil color estimating section 5d selects one approximate equation according to the result of the estimation by the race estimating section 10. Then, the pupil color estimating section 5d estimates the pupil color according to the output from the skin color specifying section 4 by using the selected approximate equation. The process in this case is the same as the process of the pupil color estimating section 5a.

Operational Example

Figure 13:
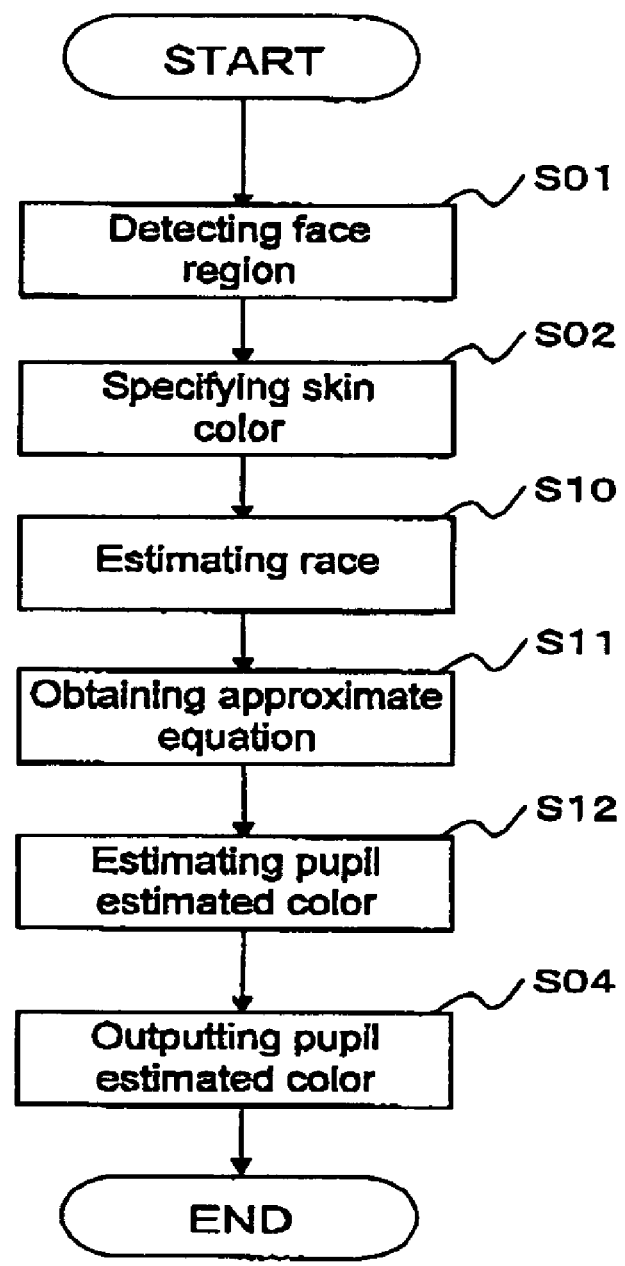
FIG. 13 shows a flowchart of an operational example of the pupil color estimating device according to the fourth embodiment.

FIG. 13 is a flowchart showing an operational example of the pupil color estimating device 1d. The operational example of the pupil color estimating device 1d will be explained with reference to FIG. 13. It should be noted that, among operations of the pupil color estimating device 1d, the process same as that of the pupil color estimating device 1a is given same numeral as that in the flowchart of FIG. 4 to omit its explanation.

In the pupil color estimating device 1d, the race estimating section 10 estimates the race of the subject (S10) after the skin color specifying section 4 specifies the skin color (S02). Subsequently, the pupil color estimating section 5d selects the approximate equation used for the process based upon the specified skin color and the estimated race (S11). The pupil color estimating section 5d estimates the original pupil color of the subject according to the race by using the selected approximate equation (S12). Then, the pupil color estimating section 5d outputs the pupil estimated color that is the result of the estimation, and ends the process (S04).

[Operation/Effect]

The approximate equation used in the pupil color estimating device 1a has depended upon the content of the set of the sample images used upon pre-obtaining this approximate equation. Accordingly, in the case where the set of the sample images include, for example, many Japanese images, the approximate equation is obtained as is suitable for the Japanese. Therefore, in the case where such approximate equation is applied as it is to the image of the Europeans and the Americans, there arises a problem that the obtained pupil estimated color has less blue color and too much black color, thus unsuitable. To cope with this problem, in the pupil color estimating device 1d, the race estimating section 10 estimates the race of the subject and the pupil color estimating section 5d selects the approximate equation used according to the race that is the result of the estimation. Accordingly, a suitable pupil color according to the race of the subject can be obtained as the result of the estimation, when the pupil color of the subject is estimated by the pupil color estimating section 5d.

Modified Example

The pupil color estimating device 1d may be configured to further have the pupil detecting section 7 and the judging section 8 like the pupil color estimating device 1b. Further, the pupil color estimating device 1d may be configured to be further provided with the correcting section 9 like the pupil color estimating device 1c.

Moreover, the selection of the approximate equation used for the estimation of the pupil color is executed by the pupil color estimating section 5d in the pupil color estimating device 1d, this selection may be executed by the race estimating section 10.

Fifth Embodiment

[System Configuration]

Figure 14:
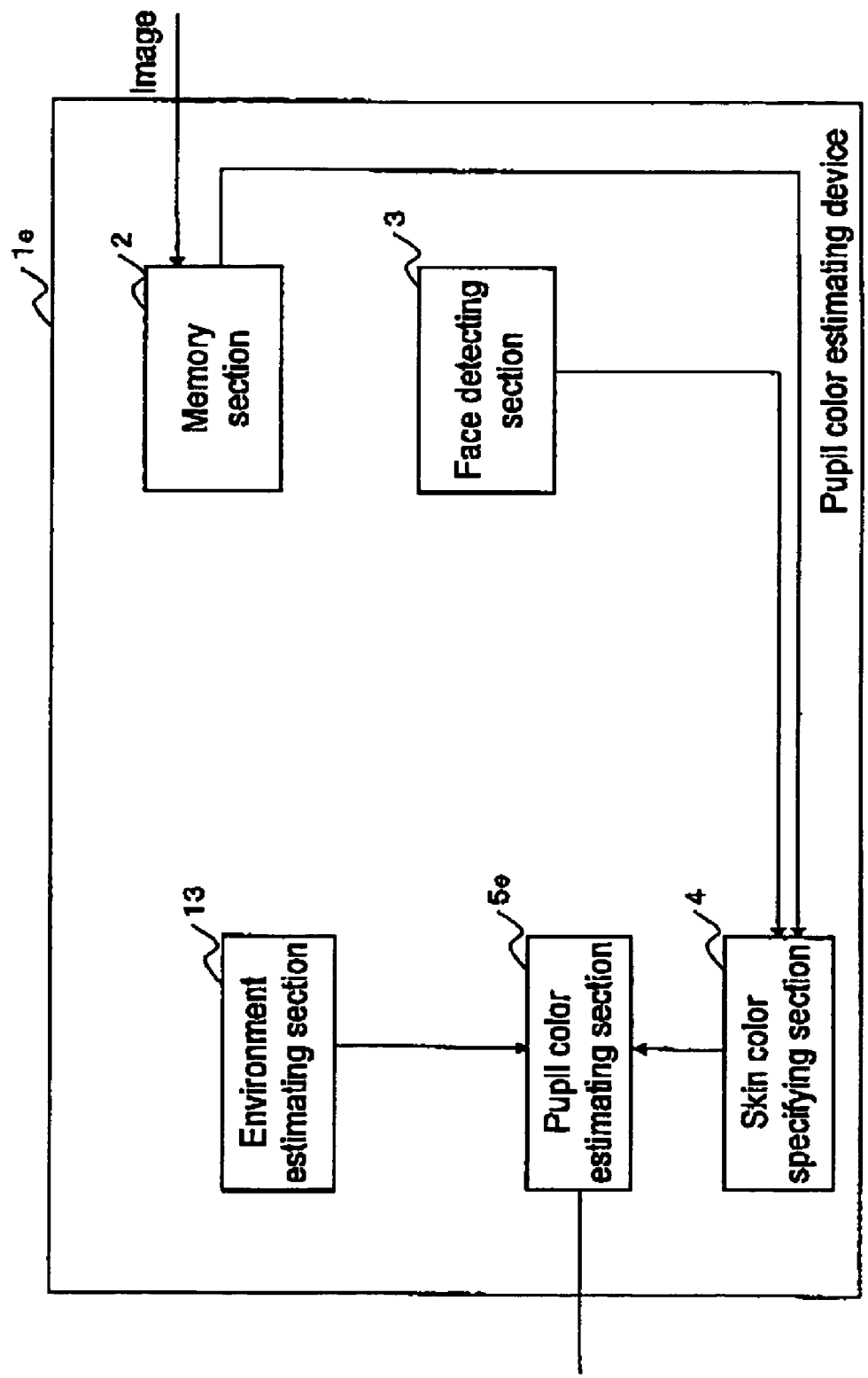
FIG. 14 shows a view of an example of a functional block of a pupil color estimating device according to a fifth embodiment.

Subsequently explained is a pupil color estimating device 1e that is the fifth embodiment of the pupil color estimating device. FIG. 14 is a view showing an example of a functional block of the pupil color estimating device 1e. The pupil color estimating device 1e is different from the pupil color estimating device 1a in that it is further provided with an environment estimating section 13. Further, the pupil color estimating device 1e is also different from the pupil color estimating device 1a in that it is provided with a pupil color estimating section 5e instead of the pupil color estimating section 5a. It should be noted that the pupil color estimating section 5e and the environment estimating section 13 are realized in such a manner that a program is executed by a CPU. Further, the pupil color estimating section 5e and the environment estimating section 13 may be configured as a dedicated chip. Moreover, each processing section may be mounted as a hybrid of a hardware and a software.

[Environment Estimating Section]

The environment estimating section 13 estimates the environment in which the pupil color estimating device 1e is installed or the environment in which it operates (environment estimating process). Then, the environment estimating section 13 obtains an approximate equation used in the pupil color estimating section 5e based upon the result of the estimation (approximate equation obtaining process). The environment estimating process and the approximate equation obtaining process will be explained hereinbelow.

[[Environment Estimating Process]]

In the environment estimating process, the environment estimating section 13 estimates the environment in which the pupil color estimating device 1e is installed or the environment in which it operates according to a predetermined reference. For example, the environment estimating section 13 may estimate the environment with the designation of the phone number of local information or maintenance information set in an OS (Operating System) or the like defined as a reference. Further, the environment estimating section 13 may estimate the environment with the time zone set in the OS or in the device defined as a reference. Moreover, the environment estimating section 13 may estimate the environment with the used language set in the OS or in the device defined as a reference.

[[Approximate Equation Obtaining Process]]

In the approximate equation obtaining process, the environment estimating section 13 obtains the approximate equation used in the pupil color estimating section 5e based upon the result of the estimation in the environment estimating process. The environment estimating section 13 stores in advance plural approximate equations. These plural approximate equations are stored so as to associate with each environment. Specifically, one approximate equation is obtained in the approximate equation obtaining process with respect to the environment estimated by the environment estimating process.

Each approximate equation stored in the environment estimating section 13 is the same approximate equation as the equation 1, and is calculated in advance so as to associate with each environment. For example, the approximate equation corresponding to the environment having a race composing ratio such as 70% of Mongoloid, 20% of Caucasoid and 10% of Negroid is obtained as follows. At first, sample images corresponding to the race composing ratio are prepared. In the case where 1000 sample images are used in total, prepared images include 700 Mongoloid images, 200 Caucasoid images and 100 Negroid images. Any of the prepared images has normal pupil image. The value of the skin color and the value of the pupil color are plotted every color of RGB in a graph with respect to all sample images, whereby the approximate equation corresponding to the equation 1 with respect to each color of RGB is obtained by a least squares method. In other words, a sample set is formed based upon the race composing ratio according to each environment, thereby obtaining the approximate equation associated with each environment.

[Pupil Color Estimating Section]

The pupil color estimating section 5e estimates the pupil color by using the approximate equation obtained by the environment estimating section 13. The specific process in this case is the same as the process of the pupil color estimating section 5a, except for the use of the approximate equation obtained by the environment estimating section 13.

Operational Example

Figure 15:
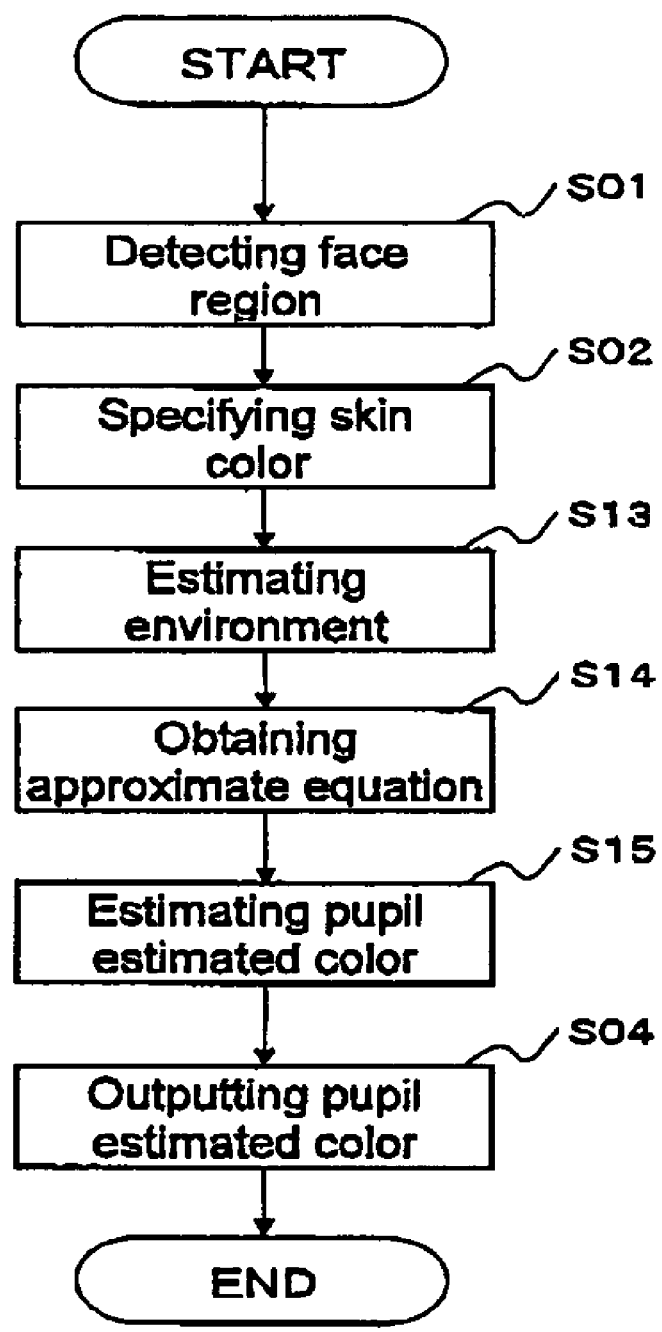
FIG. 15 shows a flowchart of an operational example of the pupil color estimating device according to the fifth embodiment.

FIG. 15 is a flowchart showing an operational example of the pupil color estimating device 1e. The operational example of the pupil color estimating device 1e will be explained with reference to FIG. 15. It should be noted that, among operations of the pupil color estimating device 1e, the process same as that of the pupil color estimating device 1a is given same numeral as that in the flowchart of FIG. 4 to omit its explanation.

In the pupil color estimating device 1e, the environment estimating section 13 executes the environment estimating process to estimate the environment (S13) after the skin color specifying section 4 specifies the skin color (S02). Then, the environment estimating section 13 further executes the approximate equation obtaining process to thereby obtain the approximate equation (S14). Thereafter, the pupil color estimating section 5e estimates the pupil estimated color by using the approximate equation obtained by the approximate equation obtaining process (S15), and outputs this color (S04).

[Operation/Effect]

The pupil color estimating device 5e estimates the environment in which the pupil color estimating device 1e is installed or the environment in which it operates, without executing the estimating process about the race of the subject, to thereby obtain an approximate equation suitable for the environment. Therefore, the effect same as that obtained by the pupil color estimating device 1d can be obtained, although the specific process is different. Specifically, in the case where the pupil color estimating device 1e is operated in Japan, for example, the approximate equation calculated based upon the race composing ratio of the Japanese is used to estimate a pupil color. On the other hand, in the case where the pupil color estimating device 1e is operated in a country having many Caucasoid, the approximate equation calculated based upon its race composing ratio is used to thereby estimate a pupil color. Therefore, a suitable pupil estimated color according to the race of the subject can be obtained. Different from the pupil color estimating device 1d, a complicated process such as the estimation of the race of the subject is unnecessary in this case, thereby being capable of achieving a high-speed process, reduction in cost, miniaturization of the device or the like in the pupil color estimating device 1e.

Modified Example

The pupil color estimating device 1e may be configured to further have the pupil detecting section 7 and the judging section 8 like the pupil color estimating device 1b. Further, the pupil color estimating device 1e may be configured to be further provided with the correcting section 9 like the pupil color estimating device 1c.

Moreover, the approximate equation obtaining process may be executed by the pupil color estimating section 5e in the pupil color estimating device 1e.

Further, the pupil color estimating devices 1a to 1e may be installed to a digital camera or a digital photo printer including a minilab machine to be used for performing an image correction of a pupil color.

Moreover, the environment estimating section 13 may estimate the environment in which the inputted image is captured based upon the information (e.g., EXIF or other header information) attached to the inputted image.

What is claimed is:

1. A pupil color estimating device comprising:
a skin color specifying unit for specifying a skin color of a subject person in an inputted image; and
a pupil color estimating unit for estimating, based upon the skin color specified by the skin color specifying unit and an association between a skin color and a pupil color that does not have an abnormality, a color of a pupil of the person that should be shown in the image,
wherein the association is stored in a memory section in advance.

2. A pupil color estimating device comprising:
a face detecting unit for detecting a face region including a part of a face or a whole face of a subject person in an inputted image;
a skin color specifying unit for specifying a skin color of the person from a color of a pixel included in the face region detected by the face detecting unit; and
a pupil color estimating unit for estimating, based upon the skin color specified by the skin color specifying unit and an association between a skin color and a pupil color that does not have an abnormality, a color of a pupil of the person that should be shown in the image,
wherein the association is stored in a memory section in advance.

3. A pupil color estimating device claimed in claim 2, further comprising:
a pupil detecting unit for detecting a pupil region including a part of the pupil or whole pupil of the person detected by the face detecting unit; and
a judging unit for judging whether an abnormality occurs on the color of the pupil of the person in the image by comparing the color of the pupil estimated by the pupil color estimating unit and a color specified from the pupil region detected by the pupil detecting unit.

4. A pupil color estimating device claimed in claim 3, wherein the judging unit judges whether the pupil section of the person in the image becomes a red-eye or not by comparing the pupil color estimated by the pupil color estimating unit and the pupil color specified from the pupil region detected by the pupil detecting unit.

5. A pupil color estimating device claimed in claim 2, further comprising:
a pupil detecting unit for detecting a pupil region including a part of the pupil or whole pupil of the person detected by the face detecting unit; and
a correcting unit for correcting the pupil color based upon the pupil color estimated by the pupil color estimating unit, with respect to the pupil region detected by the pupil detecting unit.

6. A pupil color estimating device claimed in claim 3, further comprising: a correcting unit that corrects the pupil color based upon the pupil color estimated by the pupil color estimating unit, with respect to the pupil region detected by the pupil detecting unit, in the ease where it is judged by the judging unit that an abnormality occurs on the pupil color.

7. A pupil color estimating device claimed in claim 5, wherein the correcting unit makes a correction to the pixel in the pupil region detected by the pupil detecting unit with the brightness of the pixel maintained.

8. A pupil color estimating device claimed in claim 2, wherein the pupil color estimating unit estimates a pupil color based upon a correlation between a skin color and a pupil color, this correlation obtained based upon the result of a statistical process of a skin color and a pupil color obtained from an image including a subject person that is recognized to have no abnormality occurring on the pupil section.

9. A program stored on a computer-readable medium that causes an information processing device to execute:
a step of storing an association between a skin color and a pupil color that does not have an abnormality in advance;
a step of specifying a skin color of a subject person in an inputted image; and
a step of estimating a color of a pupil of the person based upon the skin color specified by the specifying step and the association.

10. A program stored on a computer-readable medium that causes an information processing device to execute:
a step of storing an association between a skin color and a pupil color that does not have an abnormality in advance;
a step of detecting a face region of a subject person in an inputted image;
a step of specifying a skin color of the person from a color of a pixel included in the face region detected in the detecting step; and
a step of estimating a color of the pupil of the person based upon the skin color specified by the specifying step and the association.

11. A pupil color estimating method comprising:
a step of storing an association between a skin color and a pupil color that does not have an abnormality in advance;
a step in which an information processing device specifies a skin color of a subject person in an inputted image; and
a step in which an information processing device estimates a color of a pupil of the person based upon the skin color specified by the specifying step and the association.

12. A pupil color estimating method comprising:
a step of storing an association between a skin color and a pupil color that does not have an abnormality in advance;
a step in which an information processing device detects a face region of a subject person in an inputted image;
a step in which an information processing device specifies a skin color of the person from a color of a pixel included in the face region detected in the detecting step; and
a step in which an information processing device estimates a color of the pupil of the person based upon the skin color specified by the specifying step and the association.

13. A pupil color estimating device claimed in claim 2, further comprising:
an approximate equation storing unit that stores an approximate equation, used for estimating a pupil color, so as to associate with a race;
a race estimating unit that estimates the race of the subject person, wherein the race is derived from facial attributes of the subject; and
a selecting unit that selects the approximate equation stored in the approximate equation storing unit so as to associate with the estimated race,
wherein the pupil color estimating unit estimates the pupil color based upon the specified skin color and an association among a skin color, a race, and a pupil color that does not have an abnormality, using the approximate equation,
wherein the association is stored in a memory section in advance.

14. A pupil color estimating device claimed in claim 2, further comprising:
an approximate equation storing unit that stores an approximate equation, used for estimating a pupil color, so as to associate with an environment;
an environment estimating unit that estimates the environment in which this device operates or the environment in which the inputted image is captured; and
a selecting unit that selects the approximate equation stored in the approximate equation storing unit so as to associate with the estimated environment,
wherein the pupil color estimating unit estimates the pupil color based upon the specified skin color and an association among a skin color, an environment, and a pupil color that does not have an abnormality, using the approximate equation,
wherein the association is stored in a memory section in advance.

15. An imaging device comprising:
an imaging unit that captures an image;
the pupil color estimating device as recited in claim 2;
a pupil detecting unit for detecting a pupil region including a part of the pupil or whole pupil of the person detected by the face detecting unit; and
a correcting unit for correcting the pupil color based upon the pupil color estimated by the pupil color estimating unit, with respect to the pupil region detected by the pupil detecting unit.

16. A digital photo printer comprising:
an image input unit for inputting an image;
the pupil color estimating device as recited in claim 2;
a pupil detecting unit for detecting a pupil region including a part of the pupil or whole pupil of the person detected by the face detecting unit; and
a correcting unit for correcting the pupil color based upon the pupil color estimated by the pupil color estimating unit, with respect to the pupil region detected by the pupil detecting unit.

* * * * *

UNITED STATES PATENT AND TRADEMARK OFFICE
CERTIFICATE OF CORRECTION

| | | |
|---|---|---|
| PATENT NO. | : 7,590,284 B2 | Page 1 of 1 |
| APPLICATION NO. | : 10/981146 | |
| DATED | : September 15, 2009 | |
| INVENTOR(S) | : Takashi Kakiuchi et al. | |

It is certified that error appears in the above-identified patent and that said Letters Patent is hereby corrected as shown below:

In the Claims:

In Claim 6, column 24, line 32, the word "ease" should be --case--.

Signed and Sealed this

Third Day of November, 2009

David J. Kappos
*Director of the United States Patent and Trademark Office*